Figure 1:
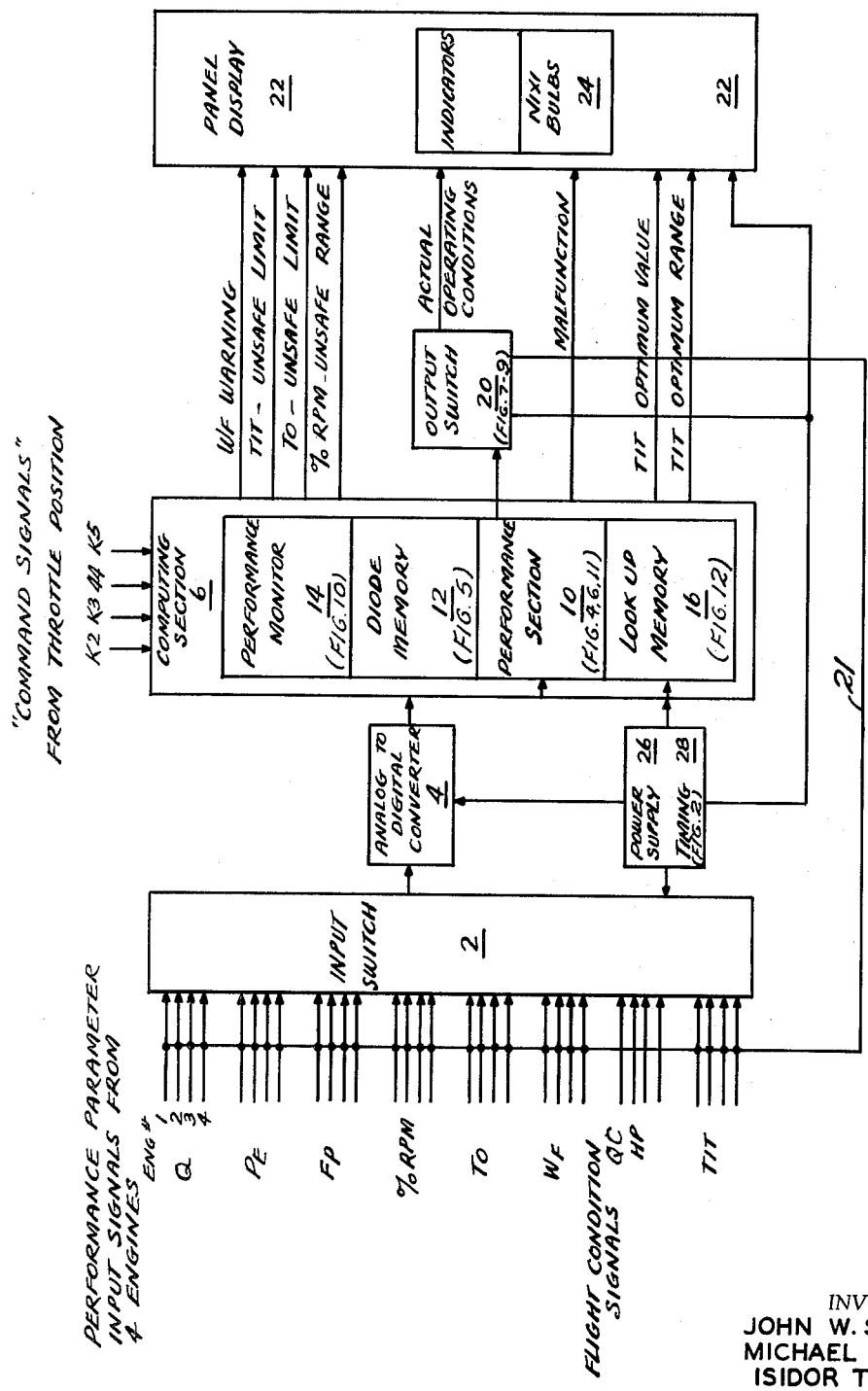

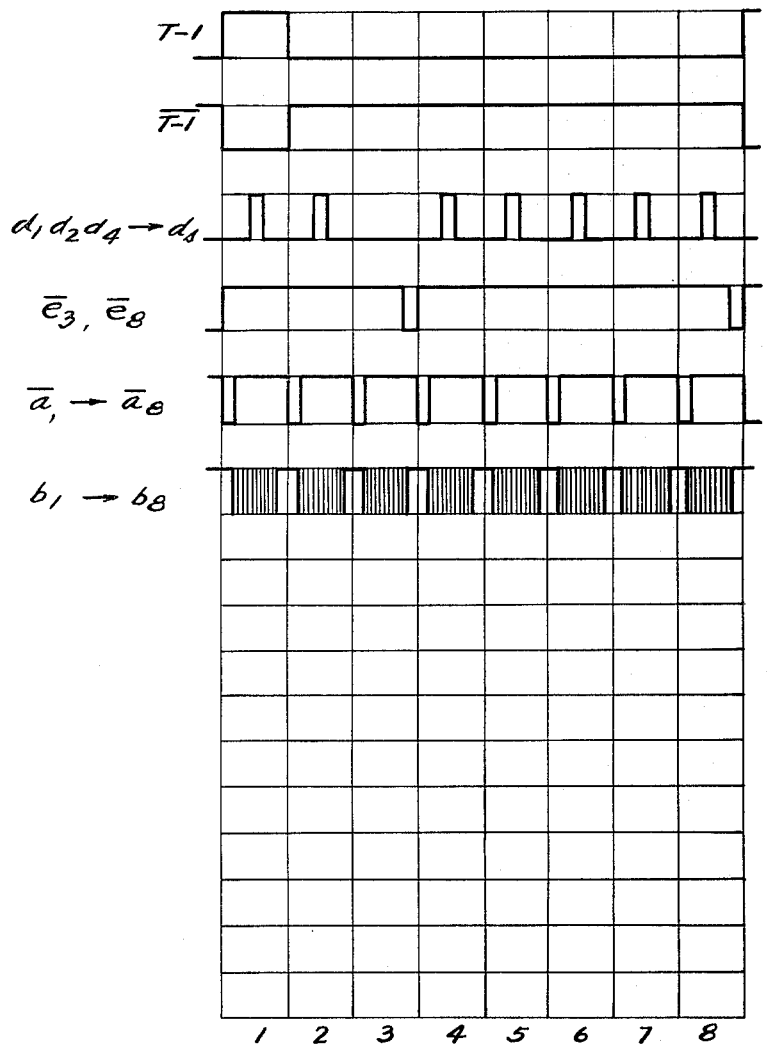

INVENTORS
JOHN W. SADVARY
MICHAEL POCHTAR
ISIDOR T. FLAUM

BY Roland Plottel
ATTORNEY

DIODE MEMORY 12
(IN COMPUTING SECTION 6)

April 19, 1966     J. W. SADVARY ETAL     3,247,498
WORST CONDITION INDICATING SYSTEM
Filed Aug. 23, 1962     12 Sheets-Sheet 9
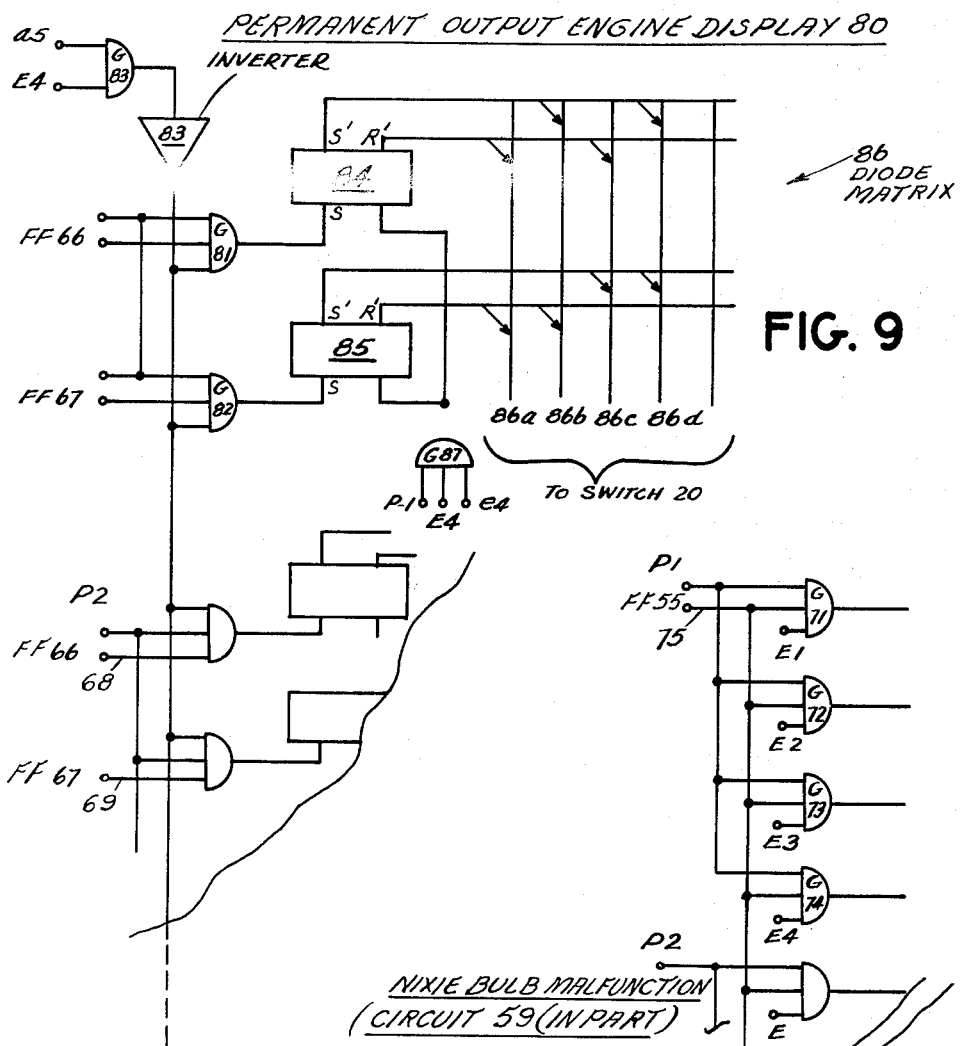
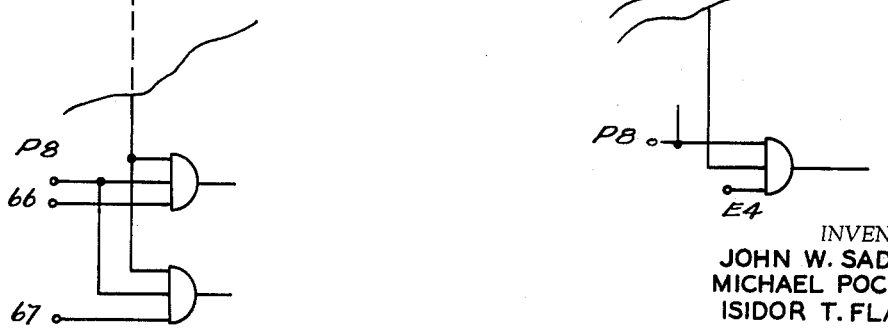
INVENTORS
JOHN W. SADVARY
MICHAEL POCHTAR
ISIDOR T. FLAUM
BY Roland Plotil ATTY.

INVENTORS
JOHN W. SADVARY
MICHAEL POCHTAR
ISIDOR T. FLAUM
BY Roland Plottel

INVENTORS
JOHN W. SADVARY
MICHAEL POCHTAR
ISIDOR T. FLAUM
BY Roland Plottel
ATTORNEY

United States Patent Office 3,247,498
Patented Apr. 19, 1966

3,247,498
WORST CONDITION INDICATING SYSTEM
John W. Sadvary, Garfield, Michael Pochtar, Livingston, and Isidor T. Flaum, Hasbrouck Heights, N.J., assignors to The Bendix Corporation, Teterboro, N.J., a corporation of Delaware
Filed Aug. 23, 1962, Ser. No. 218,070
19 Claims. (Cl. 340—213)

The invention relates generally to performance indicators and more particularly to indicators for indicating the performance of several devices.

As the speed of modern aircraft increased, aircraft instruments also increased in number and complexity to the point where the pilot can not comfortably or effectively monitor the instruments in the time available. As an example, the DC-6 has 423 instruments, controls, switches, and warning lights; whereas the later DC-8 has 638 such devices.

The increasing number of indicators reflects the increasing complexity of modern aircraft. Moreover, these complex aircraft must be operated at optimum performance parameters. As an example, consider fuel consumption as a function of speed. In a DC-8 turbo-fan, a change in speed from an optimum of .82 Mach for certain flight conditions, to .84 Mach, a change of 2.4 percent, increases the fuel consumption disproportionally by 12 percent.

As aircraft become faster and still more complex, the number of instruments will tend to increase, optimum operating parameters will become more critical, and the time available to the pilot and crew to monitor the instruments will be further shortened.

One object of the invention is to provide a novel indicator system for several devices which displays the performance parameters of the worst performing devices.

Another object of the invention is to provide a novel indicator system for indicating a malfunction in any one of several devices.

Another object of the invention is to provide a warning signal when the parameter of two devices differ from one another by more than a predetermined amount.

Another object of the invention is to provide a novel indicator system for use with several devices which computes and displays the optimum value or range of values at which the devices should operate, and the limit values beyond which the devices should not operate.

Another object of the invention is to provide a novel indicator system for monitoring a plurality of performance parameters of several devices and which displays the parameters of the worst performing devices.

Another object of the invention is to provide a novel indicator system for monitoring a plurality of performance parameters of several devices by indicating which devices, if any, are malfunctioning.

Another object of the invention is to provide a novel indicator system for monitoring a plurality of devices and providing a warning signal when two like parameters of different devices differ from one another by more than a predetermined amount.

Another object of the invention is to provide a novel indicator system, for monitoring a plurality of performance parameters of several devices and which displays the optimum value of each parameter at which the devices should operate and displays the limit of each parameter beyond which the devices should not operate.

The invention contemplates an indicator system for displaying a performance parameter of several devices comprising means for providing a signal for each device corresponding to the parameter, performance means connected to the signal means for comparing the signal and selecting the signal of the worst performing device, and indicator means connected to the performance means and to the signal means for displaying the performance parameter of the worst performing device. The indicator system also contemplates means for comparing each parameter signal to a reference and providing a malfunction signal when the parameter signal departs from the reference a predetermined amount. The system also contemplates means for providing a warning signal when two parameters differ from one another a predetermined amount. The indicator system also contemplates means for computing and displaying the optimum value or range of values at which the devices should be operating and the limit values beyond which the devices should not be operated.

The system also contemplates means for determining the above signal and value for a single parameter and for a plurality of parameters of several devices.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 2:
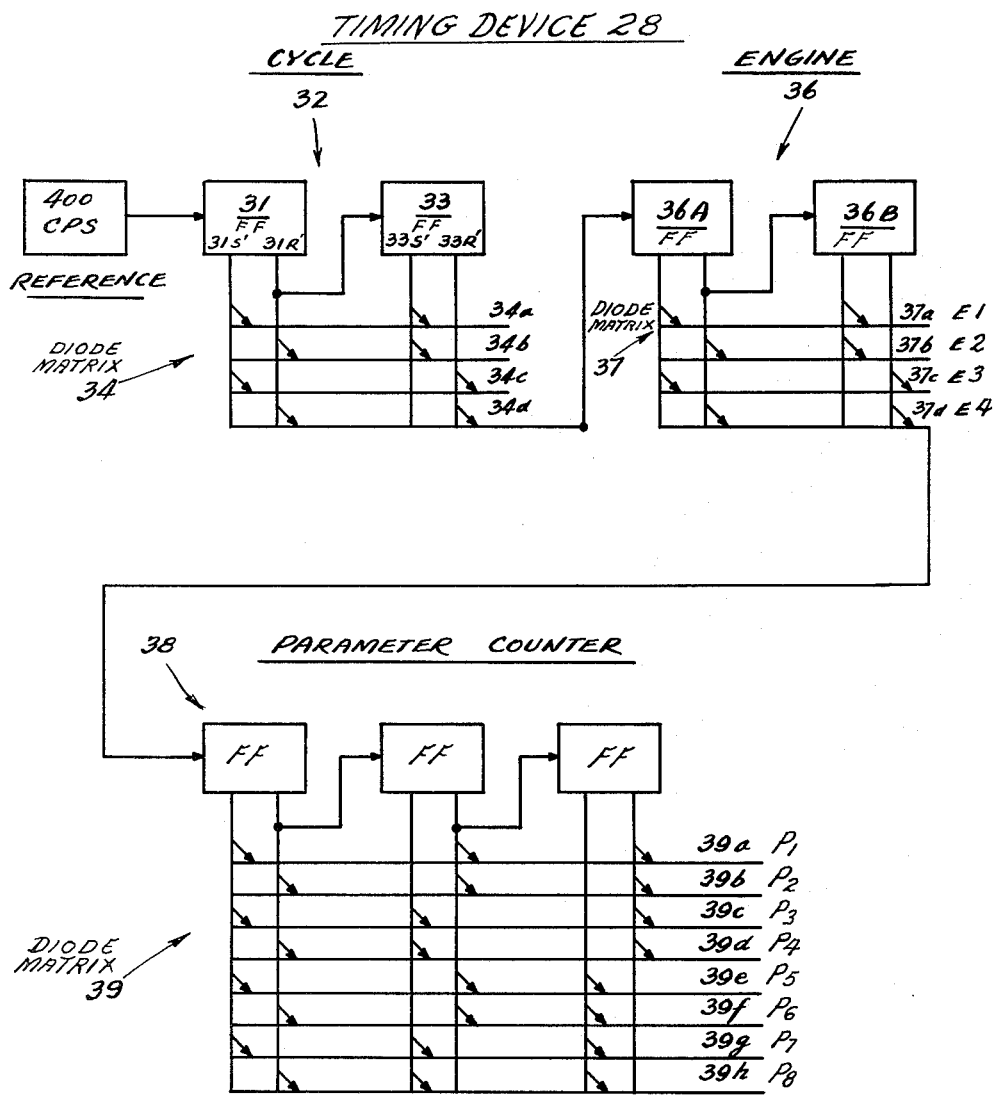
Figure 2A:
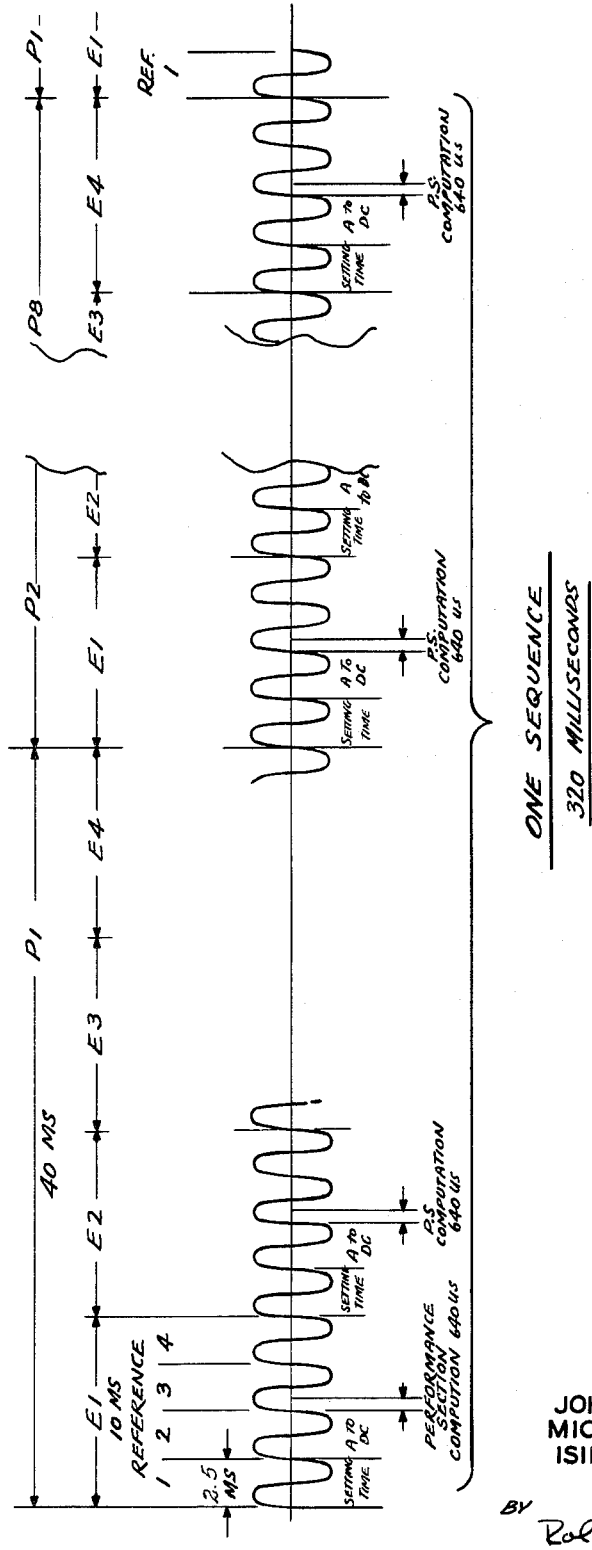
Figure 4:
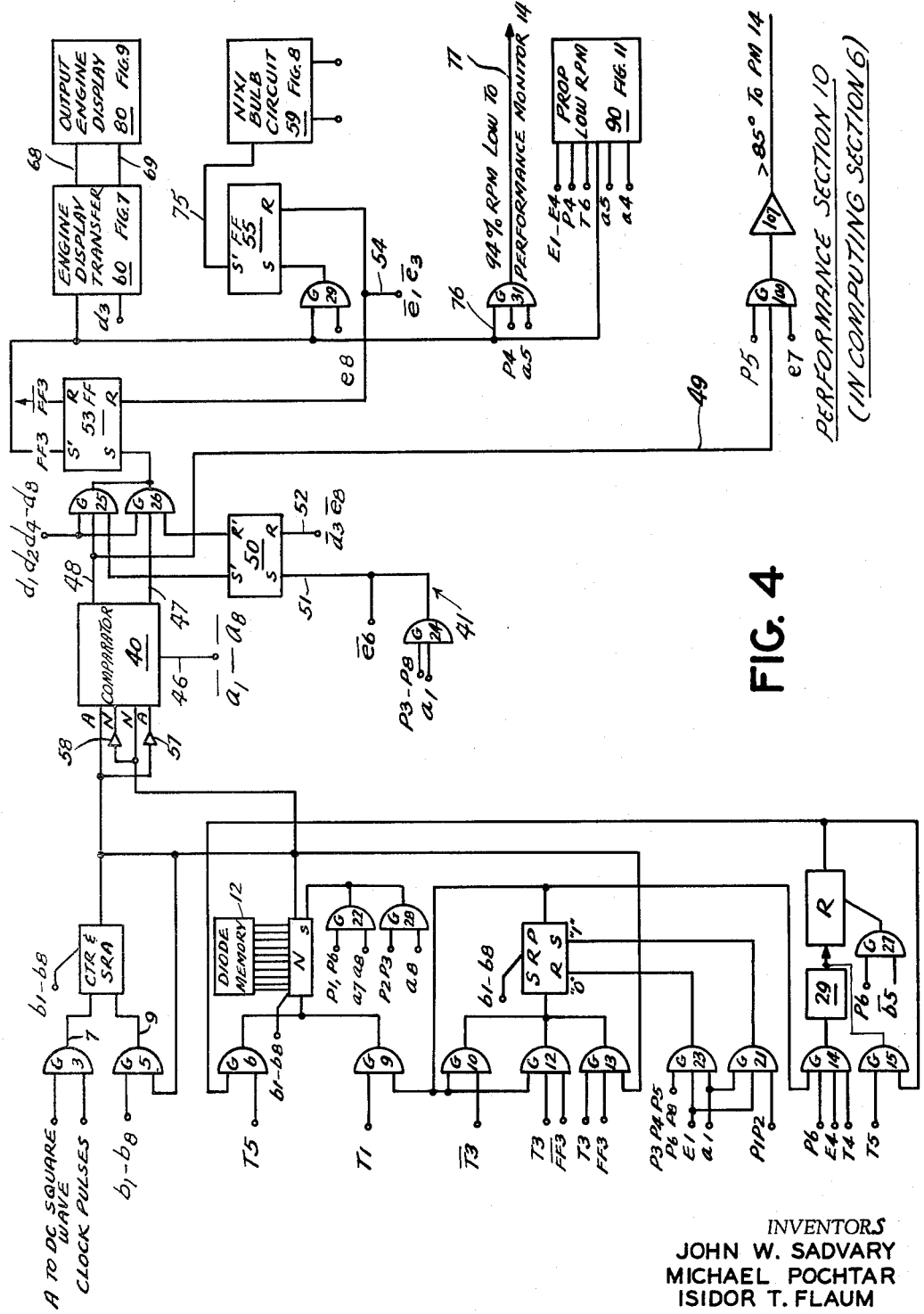
Figure 5:
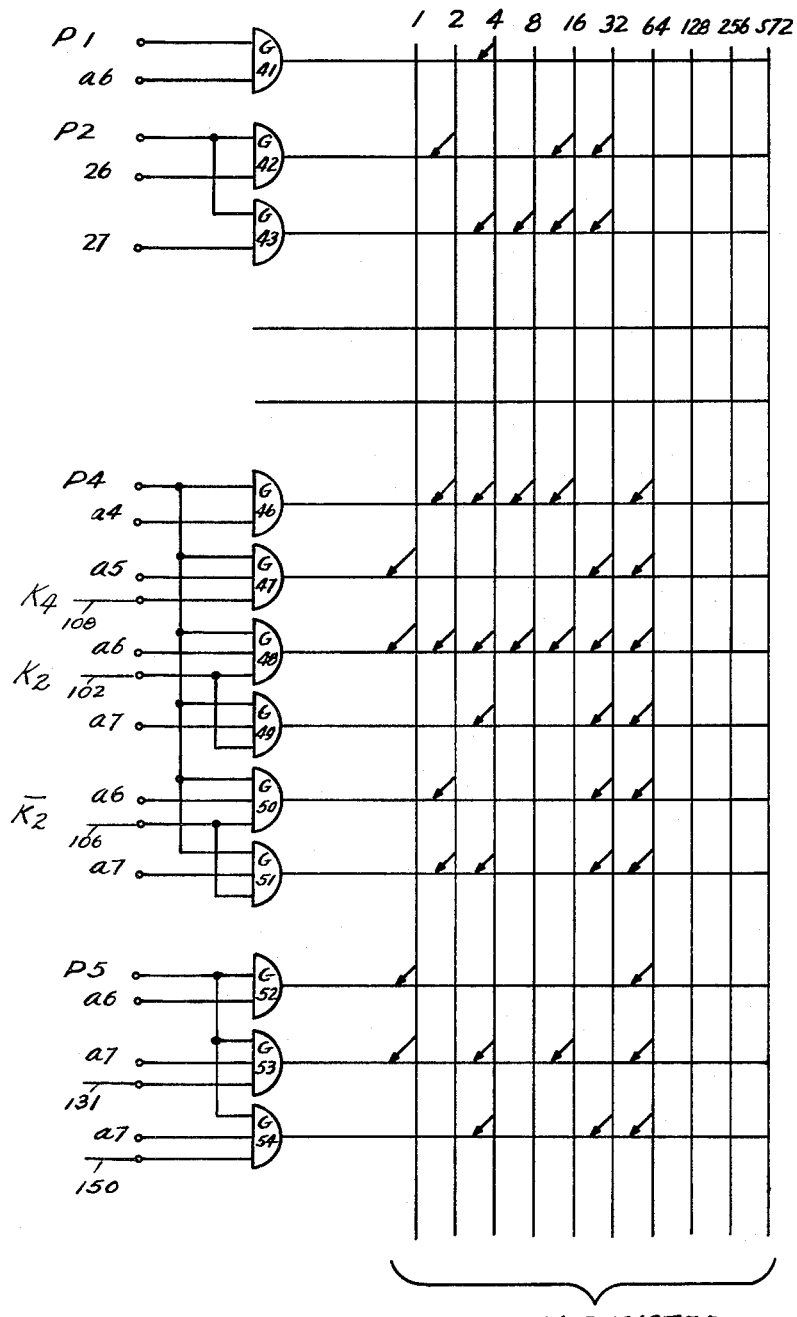
Figure 6:
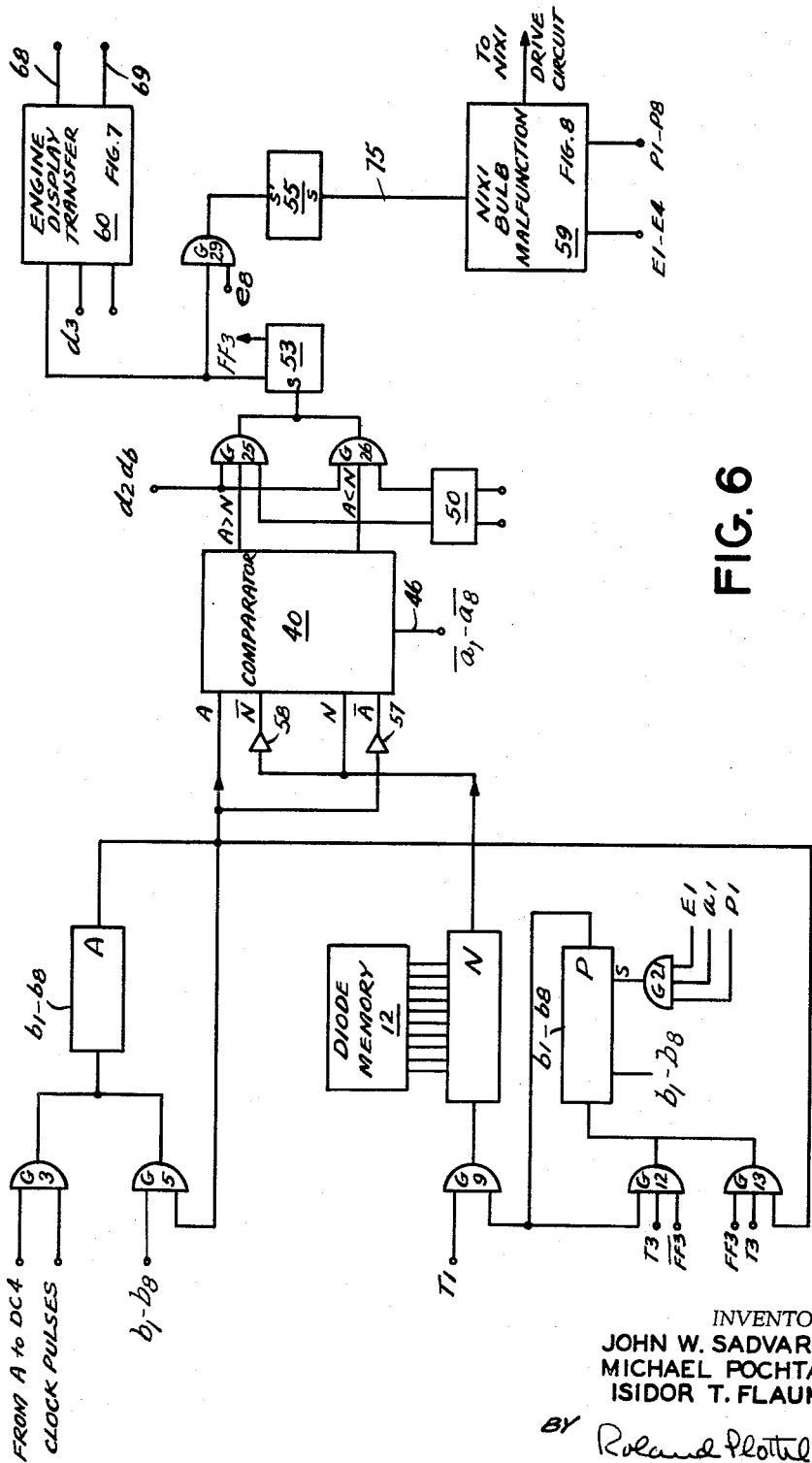
Figure 7:
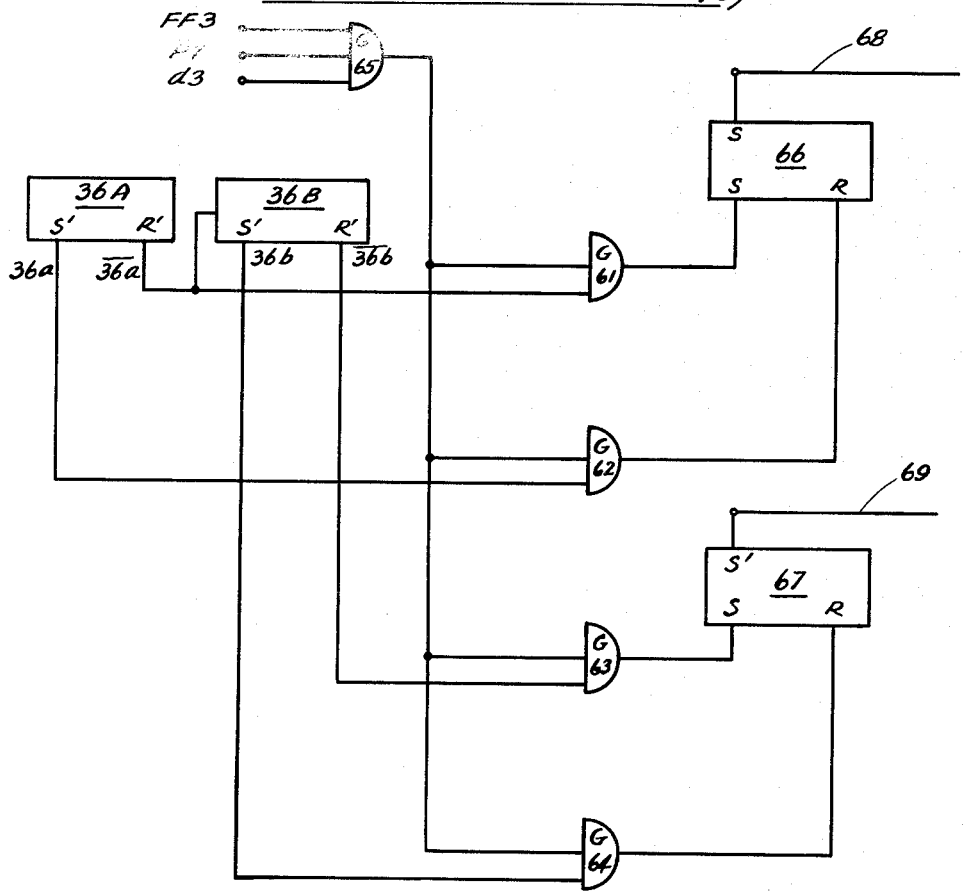
Figure 10:
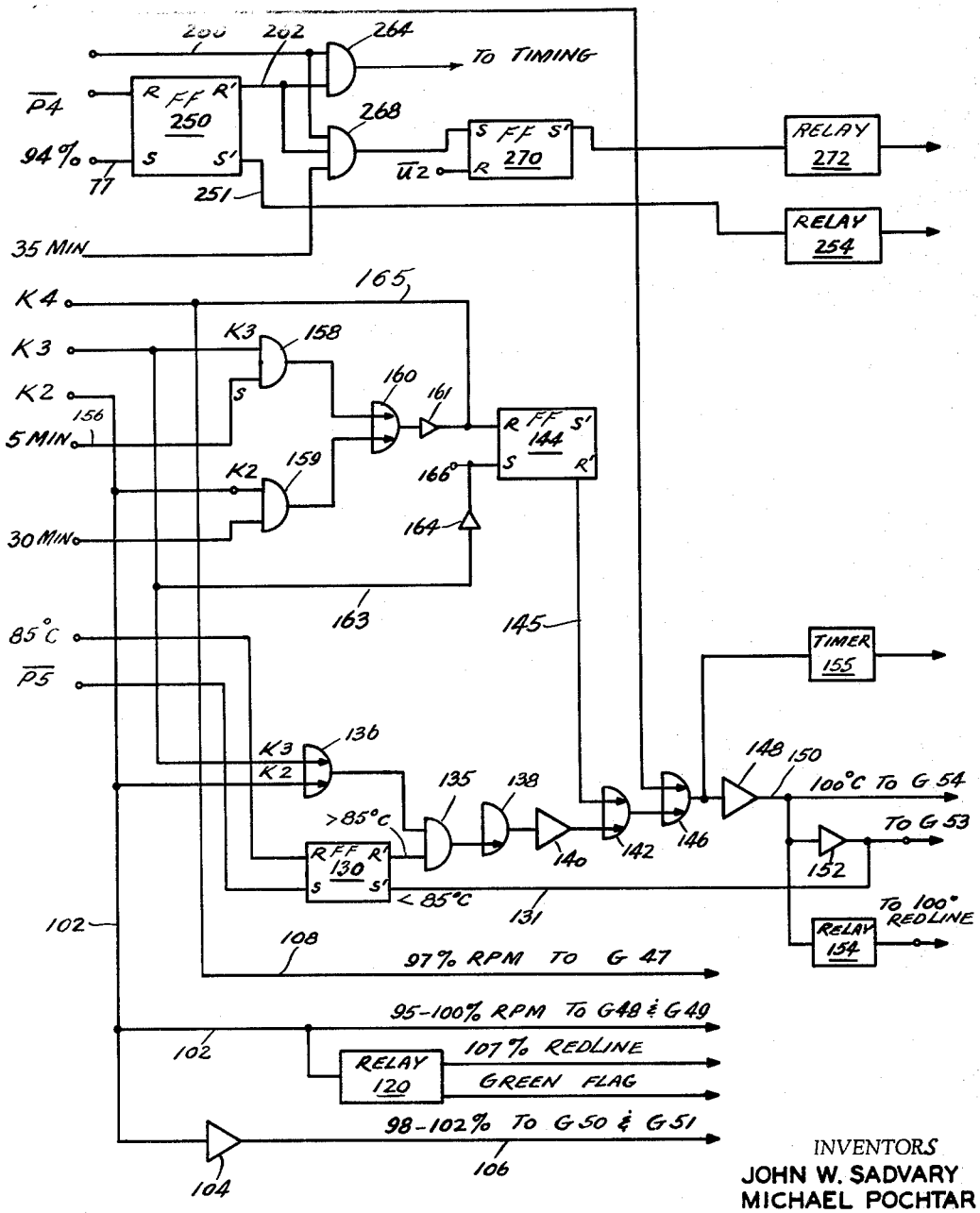
Figure 11:
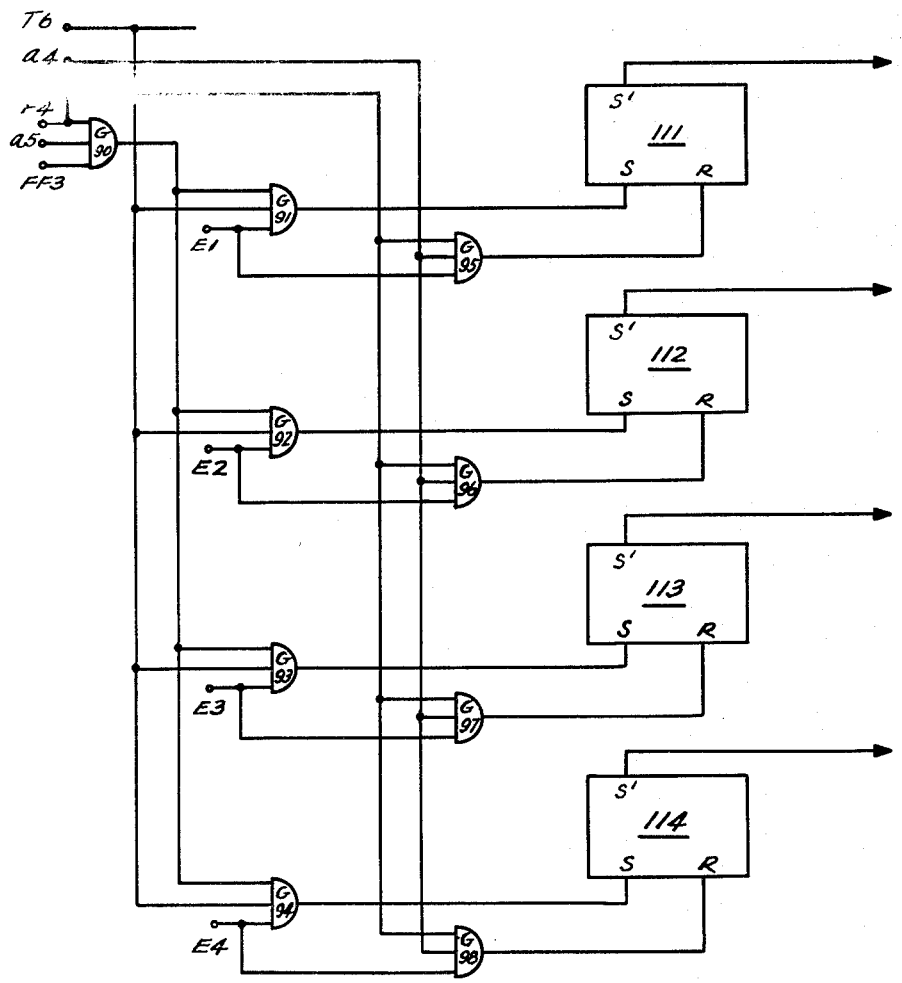
Figure 12:
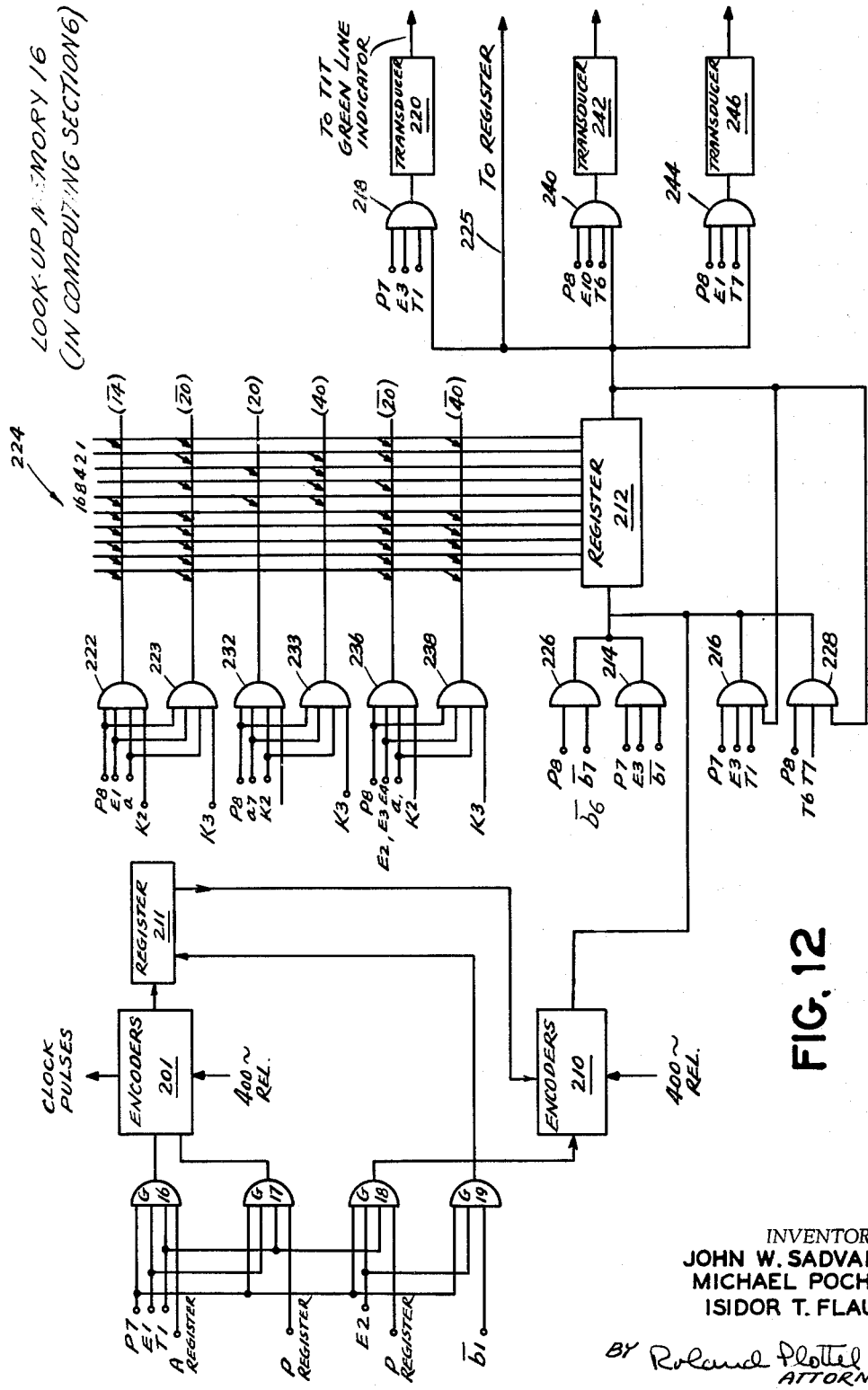

In the drawings:
FIGURE 1 is a block diagram of an indicator system constructed in accordance with the invention.
FIGURE 2 is a schematic drawing showing in detail part of the timing device shown in FIGURE 1.
FIGURE 2A is a graph illustrating one complete timing sequence.
FIGURE 3 is a graph showing representative timing signals used to sequence the performance section in the computing section shown in FIGURE 1.
FIGURE 4 is a schematic drawing of the performance section in the computing section of FIGURE 1.
FIGURE 5 is a schematic drawing of the diode memory in the computing section of FIGURE 1.
FIGURE 6 shows a portion of the performance section of FIGURE 4 to assist in explaining the operations of the section.
FIGURE 7 is a schematic drawing showing in detail the engine display transfer of the performance section shown in FIGURES 4 and 6.
FIGURE 8 is a schematic drawing of part of the Nixie drive circuit of the performance section shown in FIGURES 4 and 6.
FIGURE 9 is a schematic drawing showing in part the output engine display of the performance section shown in FIGURE 4.
FIGURE 10 is a schematic drawing of the performance monitor of the computing section of FIGURE 1.
FIGURE 11 is a schematic drawing of the Prop low RPM energizing block of the performance section of FIGURE 4.
FIGURE 12 is a schematic drawing of the performance look-up memory of the computer section shown in FIGURE 1.

Referring to the drawings and particularly to FIGURE 1, the novel indicator system constructed in accordance with the invention receives three types of input signals, namely, analog signals Q, $P_E$, $F_p$, %RPM, $T_o$, $W_F$, TIT from the four engines which are called the "performance parameter signals," signals $Q_c$ (velocity), $H_p$ (altitude) from an air data computer called "flight condition signals," and signals $K_2$ through $K_5$ indicating engine throttle position called "command signals."

The indicator system provides five types of output signals to a display panel 22 in the cockpit (1) signals proportional to the actual operating conditions of the worst performing engine, (2) signals indicating a malfunction, (3) warning signals when two engine's operation differs from each other by more than a predetermined amount, (4) greenline signals indicating the optimum operating value or range of value for a particular parameter, and (5) redline signals indicating unsafe limits or unsafe ranges of operation.

Analog signals, oil quantity Q, engine oil pressure $P_E$, oil cooler flap position $F_p$, percent revolutions per minute %RPM, oil temperature $T_0$, fuel flow $W_F$, and turbine inlet temperature TIT, proportional to the performance parameters of each of the four engines, are applied to an input switch 2 along with the signals $Q_c$, $H_p$ from the air data computer. Input switch 2 sequentially supplies the signals to an analog to digital converter 4 which converts the analog signals to binary digital signals. The digital signals are applied to a computing section 6 including a performance section 10, a diode memory 12, a performance monitor 14, and a look-up memory 16.

Performance section 10 of computing section 6 determines for each performance parameter which engine is the worst performing. Section 10 controls an output switch 20 which receives analog signals Q, $P_E$, $F_p$, %RPM, $T_0$, $W_F$, TIT through a multiple bus 21 to connect the input signal proportional to the worst performing engine to an indicator in display panel 22. It should be noted that the displayed signal is applied directly through switch 20 to display panel 22.

Computing section 6 also provides signals indicating malfunctions for each parameter in each engine and activates a bank of Nixie bulbs 24 in the display panel 22 to indicate the malfunction by engine number and parameter.

Computing section 6 also provides to display panel 22 redline signals indicating maximum and/or minimum safe ranges for certain parameters.

Computing section 6 also provides signals to display panel 22 indicating optimum performance values or ranges for certain parameters.

A power supply 26 and timing block 28 energizes and synchronizes the system.

The analog performance parameter signals may be provided by sensors (not shown) within the engines of any convenient or conventional types and the signals are converted to digital form by analog to digital converter 4.

The signals applied to input switch 2 preferably are 400 cycle per second sinusoids having a phase that varies from a reference in accordance with the parameter. For certain parameters, the most reliable sensors presently available do not provide a 400 c.p.s. variable phase signal and devices may have to be included between the sensor and converter 4 to convert the signals as sensed to phase variable 400 c.p.s. signals.

Input switch 2 sequentially connects the parameter signals to analog to digital converter 4. Each signal is connected for a duration of four cycles. The first cycle permits the settling of transients, and the analog to digital conversion is performed during the second cycle. Switch 2 may be of any convenient or conventional type, for example, electromechanical, diode switching matrix, or gating or of a novel type shown and described in April 18, 1963, U.S. patent application Ser. No. 273,994, assigned to the same assignee as the present application.

Analog to digital converter 4 converts the phase varying signal to a proportional binary pulse train. Converter 4 is of a type that receives a reference signal and the phase displaced signal with the amount of phase displacement from the reference is proportional to the analog quantity sensed. The positive zero crossing of the reference signals initiates a square waveform and the positive or negative zero crossing of the phase displaced signal terminates the square waveform. The square waveform that is generated partially qualifies a gate that also receives a high frequency pulse train from a clock to pass a number of clock pulses into a counter while the square waveform is generated.

This type of analog to digital converter is well known and is generally explained in Susskind, Notes on Analog-Digital Conversion Techniques, 1957, New York, John Wiley, cf. p. 6–8 ff. A particular circuit for generating the square waveform is shown in Carrozza and Nashelsky, application Ser. No. 173,720, assigned to the same assignee as the present application.

The converter 4 itself may be of any other convenient or conventional type, for example, of the kind shown and described in Masel and Blauvelt, application Ser. No. 176,304, assigned to the same assignee as the present application.

If digital sensors are used, converter 4 may be dispensed with, and the sensed parameter signals in digital form from switch 2 can be applied directly to computing section 6.

TIMING

The timing and synchronizing of the system is provided by timing block 28 including two two-stage counters 32, 36 and matrixes 34 and 37 respectively, a three-stage counter 38 and a matrix 39 shown schematically in FIGURE 2.

A 400 c.p.s. reference signal is applied to a flip-flop 31 of two-stage cycle counter 32. Flip-flop 31 halves the frequency of the 400 c.p.s. signal and provides alternate high and low signals at the outputs 31S' and 31R'. Output 31R' is connected to a second flip-flop 33 which halves the frequency of the 200 c.p.s. signal from flip-flop 31 and provides alternate high and low signals at outposts 33S' and 33R'. Outputs of flip-flops 31 and 33 are connected to diode matrix 34 which provides sequentially on output terminals 34a, 34b, 34c, and 34d high signals corresponding to first, second, third, and fourth cycles of the 400 c.p.s. reference. Output 34b is connected to analog to digital converter 4 and energizes the converter to perform the analog to digital conversion during the second cycle.

A second two-stage counter 36 is connected to output 34d and has flip-flops 36A and 36B connected to a diode matrix 37 and is identical to counter 32 just described. The second or Engine counter 36 and matrix 37 keeps track of which engine is being monitored, by providing a high signal on outputs 37a, 37b, 37c, and 37d of matrix 37 corresponding respectively to engines 1, 2, 3, and 4. The signals on outputs 37a, 37b, 37c and 37d are designated E1, E2, E3 and E4, respectively. Outputs 37a, 37b, 37c and 37d are connected to input switch 2 and signals E1, E2, E3 and E4 energize the switch to advance the switch to receive the parameter signal of the next engine.

A three-stage flip-flop counter 38 similar in design to the counters just described, and a diode matrix 39 analogous to the diode matrixes just described is connected to output 37d and sequentially provides high signals on outputs 39a through 39h corresponding to the parameter being sensed. The signals available at these outputs are designated P1 through P8, respectively.

If input switch 2 is of the gating type, an output from the engine matrix 37 and from the parameter matrix 39 may be used to activate the appropriate gate. The eight parameter cycles P1 through P8 constitute a timing sequence that lasts for, and is repeated each, 320 milliseconds.

There is shown in FIGURE 2A a graph illustrating one complete timing sequence. This is made up of eight P timing periods of 40 milliseconds each. Each P timing interval is, in turn, subdivided into four E timing intervals designated E1 through E4, each of which is 10 milliseconds. The E timing period has four 400 c.p.s. reference cycles, each cycle occupying 2.5 milliseconds. During the first .64 millisecond of each third reference cycle, there is a further series of timing signals called the performance section timing sequence shown in the graph of FIGURE 3. Several representative performance section timing signals are shown in FIGURE 3 where time is shown on the abscissa and the amplitude of various waveforms is shown on the ordinate. This timing sequence comprises eight major timing intervals 1 through 8 each 80 microseconds.

A timing signal T1 indicates a high is available during timing interval 1 and a low is available during timing intervals 2 through 8. A timing signal $\overline{T1}$ indicates that a low signal is available during interval 1 and that a high signal is available during intervals 2 through 8. Likewise with timing signals T2, T3, etc., $\overline{T2}$, $\overline{T3}$, etc. to T8 and $\overline{T8}$.

Each timing interval may include an "$a$" timing signal which indicates a high pulse at the beginning of the timing interval, and may include a "$d$" timing signal indicating a high pulse at the middle of the timing interval, and may include an "$e$" timing signal indicating a high pulse at the end of the timing interval. Timing signals $a$, $d$, or $e$ have subscripts thereto indicating in which major timing interval it is available. For example, if a conductor receives signals $d_1$, $d_2$, $d_4$ through $d_8$, the pulses applied would be of the type shown in graph 3. There is also available a converse of the $a$, $d$, and $e$ signals. These represent a high signal at all times except a low pulse for that period of time designated by the timing signal, for example, in the graph of FIGURE 3, there is shown an $\overline{e}_3$ pulse and an $\overline{e}_8$ pulse applied on a signal conductor and $\overline{a}_1$ through $\overline{a}_8$ timing signal applied on a signal conductor.

Also available are bundles of shift pulses, bearing the legends $b_1$ through $b_8$. Each bundle comprises ten low pulses and is supplied during the time interval indicated by the subscript.

Parameter signals P1 through P8 from parameter matrix 39 and engine signals E1 through E4 from engine matrix 37 are also used in the performance section 10, indicating which parameter is being sequenced. Signals P1 through P8 indicate a high for the duration of the parameter designated by the postscript. A converse signal, for example, $\overline{P3}$, indicates a high signal for the duration of all parameters other than parameter P3 during which time there is a low signal. Likewise, for the engine signals E1 through E4, and their converse signals $\overline{E1}$ through $\overline{E4}$.

PERFORMANCE SECTION

Performance section 10 is shown in the schematic drawing of FIGURE 4 and includes a 10 bit counter and shift register A of the kind that counts pulses applied on conductor 7 and registers pulses applied on conductor 9. Performance section 10 includes three 10 bit registers N, P and R of any conventional or convenient type adapted to receive pulses both in series and in parallel, and give up these pulses when activated by the $b$ pulse train shown in FIGURE 3. Registers N and P are set to "1" or reset to "0" upon application of a negative-going pulse at set and reset terminals S and R, respectively.

A plurality of Nand gates are included and shown in performance section 10. These gates have a high output when any input is low and a low output when all inputs are high.

A gate G3 receives a square waveform from analog to digital converter 4 and clock pulses from look-up memory block 16 to drive the register A. Gate G5 receives $b_1$ to $b_8$ signals and shifts the contents of the A register around on itself. A gate G6 receives a T5 timing signal from the output of the N register shifting the contents of the N register around on itself during each T5 timing interval. A gate G9 receives the output of the P register and a timing signal T1 and is connected to the N register to transfer the contents of the P register to the N register during the T1 timing interval. A gate G10 receives the output of the P register and the $\overline{T3}$ timing signal and transfers the contents of the P register around on itself for all timing intervals except T3. A pair of gates G12 and G13 have their outputs connected to the P register and both receive the T3 timing signal and receive, respectively, $\overline{FF3}$ signal and FF3 signal and receive, respectively, the output from P register and the output from the A register to transfer during the third timing interval the contents of the A register into the P register or the contents of the P register around on itself in accordance with the FF3 or $\overline{FF3}$ signals. A gate G14 receives P6, E4, and T4 timing signals as well as the output from P register to transfer the contents of the P register during the coincidence of the P6, E4, and T4 timing signals. A gate G15 receives the output of the R register and T5 timing signals and transfers the output of the R register around on itself during the T5 timing signal.

Gates G21 and G23 are connected, respectively, to the set and reset terminals S and R of register P, and gates G22 and G28 are connected to the set terminal S of register N for filling these registers with 1's and 0's. Gate G21 passes a signal to the S terminal upon the coincidence of P1 or P2 and an $a_1$ and E1 timing signals. Gate G23 passes an energizing signal to reset terminal R upon the coincidence of E1 and $a_1$ timing signals during either P3, P4, P5, P6 or P8 timing periods. Gate G22 passes a signal to the set S terminal of register N upon the coincidence of the $a_7$ or $a_8$ pulse during either the P1 or P6 timing period; and gate G28 passes a pulse to the set terminal upon the coincidence of an $a_8$ signal during the P2 or P3 timing intervals.

A gate G27 receives a P6 timing signal and a $\overline{b}_5$ pulse train which shift the contents of the R register during the fifth timing interval of the P6 timing period.

The outputs of the A and N registers are applied directly to and through inverters 57 and 58 to comparator 40 that is part of an interrogating subunit 41. Interrogating subunit 41 has two flip-flops 50 and 53 having set S and reset R input terminals that are activated by negative-going signals to provide a high signal at the corresponding output terminals S' and R'. Flip-flop 50 is set by the $\overline{e}_6$ signal or by a signal from a gate G24 that is activated by an $a_1$ pulse during the P3 through P8 timing intervals. Flip-flop 50 is reset upon the application of a $\overline{d}_3$ or $\overline{e}_8$ signal. Comparator 40 and flip-flop 50 are connected to gates G25 and G26 that are also partly qualified by timing signals $d_1$, $d_2$, $d_4$ through $d_8$ to energize set input of flip-flop 53. Flip-flop 53 provides FF3 and $\overline{FF3}$ signals mentioned above. These signals also energize display transfer 60 and output engine display 80. The FF3 signal energizes a Nixie bulb circuit 59 through a gate G29 and flip-flop 55. The FF3 signal passes through gate G29 when it is coincident with an $e_8$ signal to set flip-flop 55 and provide a signal on a conductor 75 to the Nixie bulb circuit 59. The FF3 signal also partially qualifies a gate G31 which is also partially qualified by a P4 and $a_5$ signal. This gate G31 provides a 94 percent low signal to performance monitor 14. The FF3 signal also energizes a prop low RPM block 90.

An output from comparator 40 is also connected to a gate G100 which is partially qualified by P6 and E7 timing signals. Output from this gate is applied through an inverter 107 providing signal to performance monitor 14 dealing with oil temperature.

The structure and operation of the comparator 40 and interrogating subunit 41 are examined in detail after which the entire performance section is examined both as to structure and operation.

Comparator 40 may be of any convenient or conventional type having the following characteristics: Two signals to be compared from the A and N registers designated A and N and their converse $\overline{A}$ and $\overline{N}$ are applied to comparator 40 which initially is placed in a condition to make a comparison by a reset pulse applied on a conductor 46. The comparator has two outputs 47 and 48. A high signal is provided on output 47 when A is less than N ($A<N$), a high is provided on output 48 when A is greater than N ($A>N$), and both conductors 47 and 48 are low when A is equal to N ($A=N$). A comparator having these characteristics is shown and described in Thomas and Weiss U.S. patent application Serial No. 219,204, assigned to the same assignee as the present application.

Outputs 47 and 48 are connected respectively to two gates G25 and G26. These gates also receive signals respectively from the set S' and reset R' outputs of an interrogating flip-flop 50 and timing signals $d_1$, $d_2$, $d_4$ through $d_8$. Gates G25 and G26 are connected to energize the set input S of an answering flip-flop 53. This flip-flop provides a signal FF3 high when the set input S is energized and a signal $\overline{FF3}$ high when its reset R is energized. Answering flip-flop 53 is reset upon the application of a negative-going pulse applied to its reset terminal through a conductor 54.

The two gates G25 and G26, and two flip-flops 50 and 53 cooperate with comparator 40 forming what may be termed an interrogating subunit 41 considering the interrogating subunit 41 as a whole, an interrogating signal is applied to the set S input of flip-flop 50 via conductor 51 if the unit is looking for A greater than N; and an interrogating signal is applied to reset terminal R via conductor 52 if the unit is looking for A less than N. A reply to the interrogation signal appears at the output of flip-flp 53 and is either "yes" or "no." "Yes" is indicated by a high on the set output S' of flip-flop 53 and is designated by FF3 high signal. "No" is indicated by a high on the reset output R' of flip-flop 53 and is designated by a $\overline{FF3}$ high signal.

The interrogating signal applied to flip-flop 50 (i.e. looking for A greater than N, or A less than N) is determined by the particular comparison being made, and in turn, is determined by the parameter and the contents of the A and N register.

Diode memory 12, performance monitor 14, and lock-up memory 16 cooperate with performance section 10 to determine the worst performing engine and malfunction of engines. Diode memory 12 provides minimum and maximum malfunction limits to the N register. Diode memory 12 is shown in detail in schematic drawing in FIGURE 5 and is of conventional type.

Performance monitor 14 determines the acceptance limits in accordance with command signals. Look-up memory 16 provides variable malfunction reference signals and optimum values, and in this embodiment is used only for one parameter.

The performance section can be best described by considering its operation for each parameter. The parameter requiring the least computation is oil quantity and is designated parameter P1. Performance section 10 determines which of the four engines has the minimum oil quantity to activate output switch 20 so that an oil quantity indicator in the cockpit displays the quantity of oil in that engine. Also, performance section 10 provides a malfunction signal to Nixie bulb indicator 24 in the cockpit causing a bulb to display the number of those engines whose oil quantity is less than four gallons.

The necessary computations are performed in timing interval T1, T2, T3, T6, and T8. The remaining time intervals are used for those parameters requiring more computations. It should be noted that the performance section goes through all the T1 through T8 steps, although the steps T4, T5, and T7 do not produce any useful information for this parameter.

The necessary computations are performed by using only the A, N, and P registers. The R register is not used for this parameter. Also, only gates G3, G5, G12 and G13 are used for this parameter.

The performance section is redrawn in FIGURE 6 showing only those parts, and indicating only those signals, that are used and provide useful information for the oil quantity parameter. The operation of the performance section for this parameter can be more easily followed with the aid of this simplified drawing and the simplified explanation that follows. The complete set of steps performed by the performance section to be used in conjunction with the drawing of FIGURE 4 is set down in outline form directly after the simplified discussion.

During the second reference cycle of the first engine E-1 of the first parameter P-1, the engine's performance as to oil quantity is gated into the A register through gate G3 by the square waveform from converter 4 prior to the operation of the performance section.

During the first timing interval T-1, gate G21 activated by signals E1 and $a_1$ fills the P register with 1's. In response to the $b_1$ pulse train signal, the contents to the A register are shifted around on itself through gate G5; and the contents of the P register are transferred to the N register through gate G9.

During the second time interval; the $\overline{a}_2$ pulse applied on conductor 46 resets comparator 40. (The interrogating flip-flop 50 has previously been reset to look for A less than N.) In response to the $b_2$ pulse train, the contents of the A and N registers are shifted directly and through inverters 57 and 58 into comparator 49. At the same time, the contents of the A register are shifted around on itself through gate G5. The $d_2$ timing signal is applied to gates G25 and G26 and if the A is less than N, gate G26 passes a signal to set flip-flop 53 producing a FF3 high signal.

During the third timing interval T3, the $b_3$ pulse train is applied to the A register to shift its contents around on itself via gate G5. When A is less than N, by the interrogation just performed, the contents of the A register are gated to the P register via gate G13 enabled by FF3 and T3. It should be noted that for the first engine A is always less than N as the N register contains a maximum number, i.e. all 1's. When A is greater than N, i.e. $\overline{FF3}$ is high, the contents of the P register are shifted around on itself through gate G12. The next timing pulse $d_3$ activates engine display transfer 60, shown in detail in the schematic drawing of FIGURE 7.

Engine display transfer 60 shown schematically in FIGURE 7 utilizes the outputs from engine counter flip-flops 36A and 36B. These outputs designated $36a$, $\overline{36a}$, and $36b$ and $\overline{36a}$ are applied respectively to Nand gate G61 through G64. Each of gates G61 through G64 also receives through a gate G65 the answering signal FF3 from flip-flop 53 upon the coincidence of FF3 high and timing signal $d_3$. Gates G61 and G62 have their outputs connected respectively to set S and reset R inputs of a flip-flop 66; and gates G63 and G64 have their output connected respectively to set S and reset R inputs of flip-flop 67. These flip-flops temporarily store the worst performing engine number. Outputs from flip-flops 66 and 67 available on conductors 68 and 69 indicate in binary code which engine is the worst performing. The code is shown in the lower portion of FIGURE 7, a "0" designating a low signal and a "1" designating a high signal.

After the fourth engine performance has been considered, the engine number in engine display transfer 60 is transferred to output engine display 80 as shown in FIGURE 4. Display 80 stores this number and activates output switching matrix 20 until the P1 parameter is again considered by computing section 6.

Referring now to both FIGURES 6 and 7, the third timing pulse $d_3$ and the FF3 high signal, activates gate G65 and partially qualifies gates G61 to G64. Engine counter flip-flops 36A and 36B qualify gates G62 and G64, resetting both flip-flops 66 and 67 and rendering a "0" "0" output on conductors 68 and 69, which outputs designate engine 1, as the temporarily worst performing engine.

Timing intervals T4 and T5 for this parameter are only used in connection with the fourth engine as is described below.

During timing interval T6, the first engine's oil quantity is compared against the malfunction limit, in this case, four gallons. Parameter signal P1 and timing signal $a_6$ applied to gate G41 in the diode memory 12 shown in FIGURE 6, causes the N register to register the malfunction limit. The $b_6$ pulses shift the contents of the A register a number (proportional to the quantity of oil in engine 1) and the contents of the N register (a number proportional to four gallons) into comparator 40. Also during the $b_6$ pulse train, the contents of the A register are shifted around on itself through gate G5. A comparison is made looking for A less than N and if A is less than N in response to a transfer pulse $d_6$ applied to gate G26, flip-flop 53 is set, i.e. and a FF3 high signal indicates a malfunction in engine 1.

The seventh timing cycle T7 performs no computations for this parameter.

In the eighth timing cycle T8, timing signal $e_8$ and answering signal FF3 from flip-flop 53 are applied to a gate G29. (Signal FF3 is high if there is a malfunction.) Gate G29 sets a flip-flop 55 that in turn energizes a Nixie bulb malfunction circuit 59. This circuit is shown in part in FIGURE 8 and contains 32 gates, each of which corresponds to a different engine for a different parameter. Each gate receives a parameter signal and an engine signal and output from FF55. The gates for parameter P1 are shown and designated G71 through G74. A low output from any of the gates energizes a Nixie bulb drive circuit (not shown) that causes the appropriate Nixie bulb and number to light up. The number is illuminated for an interval of $127/400$ of a second, i.e. until the same engine is again compared as to malfunction for the same parameter in the sampling cycle.

After the eighth timing cycle T8 i.e. when the performance section has completed its operation for engine oil quantity for the first engine there is stored in the P register a digital number proportional to the first engine oil quantity. If this quantity of oil is less than four gallons, the Nixie bulb corresponding to oil quantity has illuminated thereon the numeral "1."

The oil quantity of engine E2 is next considered. Input switch 2 applies a signal corresponding to the oil quantity of engine E2 to analog to digital converter 4. During the second reference cycle, analog to digital converter 4 enters a digital number proportional to the oil quantity of engine 2 into the A register. During the third reference cycle, performance section 10 compares the number in the A register with the number at the P register (i.e. the oil quantity in engines 2 and 1 is compared). The smaller of the two numbers is stored in the P register, and the larger is discarded.

During the third timing interval T3, a $d_3$ signal activates the engine display transfer gates and, if the quantity of oil in engine 2 is less than the quantity of oil in engine 1, the FF3 signal is high and gate G65 (FIG. 7) passes a signal so that flip-flop 66 is activated to change state.

During the sixth timing interval T6, the oil quantity of engine 2 is compared with the four gallon limit. If engine 2 has less than four gallons, the oil quantity parameter Nixie bulb's number "2" is illuminated. This bulb and number are selected during the eighth timing cycle by the coincidence of a FF3 high signal and an $e_8$ signal applied to gate G29 that sets flip-flop 55, that in turn provides a high to Nixie circuit 59 on conductor 75. In Nixie circuit 59, only gate G72 is partially qualified by the P–1, E–2 timing signals. The high from flip-flop 55 on conductor 75 fully qualifies only gate G72, activating Nixie drive circuit (not shown) and illuminates numeral "2" in the Parameter 1 Nixie bulb.

Likewise, for the remaining two engines, the performance section 10 repeats the same steps to determine the worst performing engine, and if there is a malfunction, illuminates an appropriate Nixie bulb number.

There is set down below in detailed outline form the steps performed by the performance section in determining the oil quantity measurements. Certain steps do not lead to any useful information for the oil quantity parameter, but are included herein because they are necessary for other parameters. The performance section goes through all the steps shown in the outline once for each of the four engines in the outline, and the steps are repeated four times, once for each of the four engines.

*Parameter 1*

OIL QUANTITY $T_1$ $a_1$—Reset comparator 40, $\bar{a}_1$ on conductor 46
   (Load SR. P with 1's on engine 1) gate G21
 $b_1$—(Compare SR. A with SR. N. Answer must be "NO.")
   Shift contents of SR. P into SR. N via gate G9
   Shift SR. A around on itself via gate G5
   Shift SR. P around on itself via gate G10
 $d_1$—(Set flip-flop 53 if answer to comparison is "YES.")
 $e_1$—Reset flip-flop 53 and flip-flop 55 ($\bar{e}_1$ on conductors 54)

$T_2$ $a_2$—Reset comparator 40 ($\bar{a}_2$ on conductor 46)
 $b_2$—Compare SR. A with SR. N looking for $A<N$.
   Shift SR. A around on itself via gate G5
   Shift SR. P around on itself via gate G10
 $d_2$—Set flip-flop 53 if answer to comparison is "YES" $d_2$ to gate G26

$T_3$ $a_3$—Reset comparator 40 $\bar{a}_3$ on conductor 46
 $b_3$—If flip-flop 53 has been set, shift contents of SR. A into SR. P via gate G13
   If flip-flop 53 has not been set, shift SR. P around on itself via gate G12
   Shift SR. A around on itself via gate G5
 $d_3$—(Reset flip-flop 50 for $A<N$ $\bar{d}_3$ on 52)
   If flip-flop 53 has been set, transfer engine number information into storage flip-flops 66 and 67 via gate G65 FIGURE 7
 $e_3$—Reset flip-flop 53 and flip-flop 55 ($\bar{e}_3$ on conductor 54)

$T_4$ $a_4$—Reset comparator 40 $\bar{a}_4$ on conductor 46
 $b_4$—(Compare SR. A with SR. N. Answer must be "NO.")
   Shift SR. A around on itself via gate G5
   Shift SR. P around on itself via gate G10
 $d_4$—(Set flip-flop 53 if answer to comparison is "YES.")
 $e_4$—On Engine 4, provide pulse to gate G87 FIGURE 9 to clear output matrix 86

$T_5$ $a_5$—Reset comparator 40 $\bar{a}_5$ on conductor 46
   On engine 4, provide pulse to gate G83 of FIGURE 9 to transfer worst case engine information
 $b_5$—(Compare SR. A with SR N. Answer must be "NO.")
   Shift SR. A around on itself via gate G5
   Shift SR. P around on itself via gate G10
 $d_5$—(Set flip-flop 53 if answer to comparison is "YES.")

$T_6$ $a_6$—Reset comparator 40 $\bar{a}_6$ on conductor 46
   Load SR. N with Para. 1 lower malfunction limit via gate G41, diode memory 12 FIGURE 6
 $b_6$—Compare SR. A with SR. N looking for $A<N$.
   Shift SR. A around on itself via gate G5
   Shift SR. P around on itself via gate G10
 $d_6$—Set flip-flop 53 if answer to comparison is "YES" via gate G26
 $e_6$—Set flip-flop 50 for $A>N$ $\bar{e}_6$ on conductor 52

$T_7$ $a_7$—Reset comparator 40 $\bar{a}_7$ on conductor 46
   Load SR. N with 1's gate G22
 $b_7$—(Compare SR. A with SR. N. Answer must be "NO")
   Shift SR. A around on itself via gate G5
   Shift SR. P around on itself via gate G10
 $d_7$—(Set flip-flop 53 if answer to comparison is "YES.")

$T_8$ $a_8$—Reset comparator 40 $\bar{a}_8$ on conductor 46
Load SR. N with 1's via gate G22
$b_8$—(Compare SR. A with SR. N. Answer must be "NO.")
Shift SR. P around on itself via gate G10
$d_8$—(Set flip-flop if answer to comparison is "YES.")
$e_8$—Set flip-flop 55 if flip-flop 53 is set via gate G29 (malfunction indication.)
Reset flip-flop 53 for A N $\bar{e}_8$ on conductor 52

In the outline, there is provided an $e_4$ signal and an $a_5$ signal that are used only during the fourth E4 engine cycle. The $a_5$ signal transfers the engine number of the worst performing engine temporarily stored in flip-flops 66 and 67 to a permanent output engine display 80, shown in part in the schematic drawing of FIGURE 9. Output circuit 80 directly activates output switch 20 to transfer the analog signal of the worst performing engine to a suitable indicator device in the cockpit.

Output engine display 80 has seven output units, one for each parameter, but in FIGURE 9 only the unit for the P1 parameter is shown completely with legend. The remaining six units are of identical structure but have different input and output connections.

The P1 output unit has a pair of input gates G81 and G82 which receive a P1 signal and a timing signal from a gate G83 through an inverter 83 upon the coincidence of an E4 signal with an $a_5$ signal. Gates G81 and G82 receive outputs from flip-flops 66 and 67 respectively. Outputs from gates G81 and G82 are applied respectively to set inputs S of flip-flops 84 and 85, thus the coded engine number stored in flop-flops 66 and 67 of engine display transfer 60 is transferred to flip-flops 84 and 85 by timing pulse $a_5$ during the fourth engine cycle. A diode matrix 86 connected to the output S' and R' of flip-flops 84 and 85 decodes the engine number and provides a high signal on one of four matrix output conductors 86a, 86b, 86c, or 86d indicating the worst performing engine. These conductors energize output switch 20. The $e_4$ timing signal coincident with the E4 engine signal and P1 parameter signal energize a Nand gate G87 to reset flip-flops 84 and 85 and clear matrix 86 just prior to the transferring timing signal from gate G83.

The second parameter P2 is engine oil pressure and the computations performed by performance section 12 for this parameter are similar to those performed for oil quantity. The engine oil pressure in the engine having lowest pressure is displayed in the cockpit to the pilot, and a malfunction is indicated on the Nixie bulb for each engine where oil pressure is less than 50 pounds per square inch. Both of these indications are analogous to the previous parameter. For engine oil pressure, however, a malfunction is also indicated whenever any engine's oil pressure is greater than 60 pounds per square inch. A comparison of an engine's oil pressure and the upper malfunction limit is performed during the seventh timing period T7. The logical steps for all the computations are set out below in outline form.

*Parameter 2*

ENGINE OIL PRESSURE $T_1$ Same as Parameter 1
$T_2$ Same as Parameter 1
$T_3$ Same as Parameter 1
$T_4$ Same as Parameter 1
$T_5$ Same as Parameter 1
$T_6$ $a_6$—Reset comparator 40 $\bar{a}_6$ on conductor 46
Load SR. N with Para. 2 lower malfunction limit from gate G42 in diode memory
$b_6$—Compare SR. A with SR. N looking for $A<N$.
Shift SR. A around on itself via gate G5
Shift SR. P around on itself via gate G10
$d_6$—Set FF53 if answer to comparison is "YES" via gate G26
$e_6$—Set FF50 for $A>N$ $\bar{e}_6$ on conductor 51

$T_7$ $a_7$—Reset comparator 40 $\bar{a}_7$ on conductor 46
Load SR. N with Parameter 2 upper malfunction limit from gate G43 in diode memory 12
$b_7$—Compare SR. A with SR. N looking for $A>N$.
Shift SR. A around on itself via gate G5
Shift SR. P around on itself via gate G10
$d_7$—Set FF53 if answer to comparison is "YES" via gate G25
$T_8$ Same as Parameter 1.

The third parameter is oil cooler flap position. For this parameter, the performance section determines which engine has the maximum flap position and indicates the flap position of that engine on an indicator in the cockpit. There is no malfunction measurements for flap position. This parameter differs from the previous ones in that the engine having a maximum flap position is the worst performing while in the previous parameter the engines having a minimum value were the worst performing. Therefore, at the beginning of the performance section's operations for the first engine, the P register is reset and filled with zeroes by negative going pulses applied from gate G23 upon the coincidence of a P3, E1 and $a_1$ signals.

There is set down below in outline form the steps carried out by the performance section.

*Parameter 3*

OIL COOLER FLAP POSITION $T_1$ $a_1$—Reset comparator 40 $\bar{a}_1$ on conductor 46
Load SR. P with 0's on engine 1 via gate G23
Set flip-flop 50 for $A>N$ via conductor 51 and a gate G24
$b_1$—(Compare SR. A with SR. N. Answer must be "YES")
Shift contents of SR. P into SR. N via gate G9
Shift SR. A around on itself via gate G5
Shift SR. P around on itself via gate G10
$d_1$—(Set flip-flop 53 if answer to comparison is "YES")
$e_1$—Reset flip-flop 53 and flip-flop 55 $e_1$ on conductor 54

$T_2$ $a_2$—Reset comparator 40 $\bar{a}_2$ on conductor 46
$b_2$—Compare SR. A with SR. N. looking for $A>N$.
Shift SR. A around on itself via gate G5
Shift SR. P around on itself via gate G10
$d_2$—Set flip-flop 53 via gate G25 if answer to comparison is "YES."

$T_3$ Same as Parameter 1
$T_4$ Same as Parameter 1
$T_5$ Same as Parameter 1
$T_6$ $a_6$—Reset comparator 40 $\bar{a}_6$ on conductor 46
$b_6$—(Compare SR. A with SR. N. Answer must be "NO.")
Shift SR. A around on itself via gate G5
Shift SR. P around on itself via gate G10
$d_6$—(Set flip-flop 53 if answer to comparison is "YES.")
$e_6$—Set flip-flop 50 for A N $\bar{e}_6$ on conductor 51

$T_7$ $a_7$—Reset comparator 40 $\bar{a}_7$ on conductor 46
$b_7$—(Compare SR. A with SR. N. Answer must be "YES.")
Shift SR. A around on itself via gate G5
Shift SR. P around on itself via gate G10
$d_7$—(Set flip-flop 53 if answer to comparison is "YES")

$T_8$ $a_8$—Reset comparator 40 $\bar{a}_8$ on conductor 46
Load SR. N with 1's by a gate G28
$b_8$—(Compare SR. A with SR. N. Answer must be "NO.")
Shift SR. P around on itself via gate G10
$d_8$—(Set flip-flop 53 if answer to comparison is "YES.")
$e_8$—(Set flip-flop 55 if flip-flop 53 is set (malfunction indication) via gate G29
Reset flip-flop 50 for $A<N$ $\bar{e}_8$ The fourth parameter is percent revolutions per minute, abbreviated %RPM.

Performance section 10 during time intervals T1, T2, and T3 determines as the worst performance engine that engine which has the largest %RPM. The parts used, and the logical steps performed are identical to those of the previous parameter as described above.

Performance section 10 determines during timing interval T4, and provides during timing pulse $a_5$, a signal indicating if an engine is revolving at less than 94% RPM. The determination is made as follows; comparator 40 is reset by an $\bar{a}_4$ pulse on conductor 46, register N is filled with a 94% limit from diode matrix 12 activated by P4 and $a_4$ signals applied to a gate G46. The contents of the A register containing a number proportional to a particular engine %RPM, and the contents of the N register proportional to the 94% RPM limit are shifted by the $b_4$ pulse train into comparator 40 for comparison. Flip-flop 50 has previously been reset by $\bar{a}_3$ signal therefor interrogation unit 41 is looking for A (an engine's % RPM) less than N (94% RPM). A $d_4$ pulse applied to gate G26 synchronizes an output pulse from gate G26, if A is less than N, to set flip-flop 53. If set, flip-flop 53 provides a high signal on conductor 76 to a gate G31, that is further partially qualified by a P4 signal. Gate G31 is then fully qualified by an $a_5$ pulse to pass a negative pulse to the performance monitor 14 via conductor 77. This pulse is used in computations of the 8th parameter, turbine inlet temperature.

During the T5 timing period, performance section 10 provides a "Prop low" warning signal if an engine's %RPM is less than 97% and the throttle position is above flight idle CA$b$FI or at full throttle CAFT. To determine if the throttle is CA$b$FI or CAFT, performance monitor 14, through a conductor 108 provides a K4 signal, indicating that the throttle is in either the CA$b$FI or CAFT position, to a gate G47 in diode memory 12. Gate G47 also received P5 and $a_5$ timing signals, and when the signals coincide, a signal proportional to 97% RPM is gated into the N register.

Performance section 10 in response to the $b_5$ pulse compares the number in the A register (proportional to the %RPM of an engine) with number in the N register, the 97% limit. Interrogation subunit 41 has been set by the $d_3$ signal to look for A less than N. If A is less than N, flip-flop 53 is set via $d_5$ signal to gate G26 providing a FF3 high signal to the prop low RPM energizing block 90, shown in detail in the schematic drawing of FIGURE 11. Block 90 illuminates, as appropriate, lights in the cockpit labeled "Prop low engine 1," "Prop low engine 2" etc.

Block 90 includes a first Nand gate G90 that receives the P5, $a_5$ and FF3 signals, and a group of four Nand gates G91 through G94 that are energized by an output from gate G90, timing signal T6, and each respectively by engine signals E1 through E4. Gates G91 through G94 have outputs connected respectively to set S inputs of four flip-flops 111 through 114. Set output S' from these flip-flops directly energize a corresponding "Prop low Engine No." light display.

Each of the flip-flops 111 through 114 are reset just prior to the interrogation by a signal respectively from gates G95 through G98. These gates are energized respectively by the coincidences of an engine signal E1 through E4 with signals P5 and $a_4$.

During time intervals T6 and T7, the performance section compares an engine's performance to variable lower and upper malfunction limits and provides a malfunction signal to illuminate a Nixie bulb in accordance with those engines whose %RPM is outside of these limits. The variable upper and lower limits are determined by performance monitor 14 and are a function of throttle position. There are four throttle positions (1) closed below flight idle, CBFI; (2) closed at flight idle, CA$t$FI; (3) closed above flight idle, CA$b$FI, and (4) closed at full throttle, CAFT. Each of these throttle positions provides one or more of four command signals designated K2 through K4 and the relationship between the throttle position and signals is as follows. For throttle position CBFI, K2 is high and K3, K4, and K5 are low. For throttle position CA$t$FI, K3 is high and all the other signals are low. For throttle position CA$b$FI, the K3 and K4 signals are high and the K2 and K5 signals are low. For throttle position CAFT, the K3, K4, and K5 signals are high and the K2 signal is low. Both the K2 through K5 signals as well as their inverses $\overline{K2}$ through $\overline{K5}$ are used.

Reference is now made to the schematic drawing of performance monitor 14, shown in FIGURE 10 and particularly to the lower portion of the drawing where there is shown the output signal relating to %RPM.

The requirements on the indicator system are that when the throttle position is closed below flight idle, CBFI, the lower malfunction limit is 95% RPM and the upper malfunction limit is 100% RPM, and for any other throttle position, the lower malfunction limit is 98% RPM and the upper malfunction limit is 102% RPM.

When the throttle is closed below flight idle, a K2 signal is high and the $\overline{K2}$ signal is low. K2 signal is applied in performance monitor 14 on a conductor 102 which connects to gates G48 and G49 in diode memory 12 half qualifying the gates. Thus when gate G48 receives timing signals $a_6$, a number proportional to 95% RPM is enabled into the N register, and when gate G49 receives timing signal $a_7$, a number proportional to 100% RPM is enabled into the N register.

When the throttle position is other than at closed below flight idle, K2 signal is low, and $\overline{K2}$ signal is high. A K2 signal available on conductor 102 is converted to $\overline{K2}$ by inverter 104, and the $\overline{K2}$ signal is applied via conductor 106 to gates G50 and G51 in diode memory 12. These gates are partially qualified by the $\overline{K2}$ signal and are activated respectively by timing signals $a_6$ and $a_7$ to provide respectively lower and upper malfunction limits of 95% and 102% to the N register.

The operation of performance section 10 during the fourth parameter are set out below in outline form.

*Parameter 4*

% RPM

T₁ Same as Parameter 3
T₂ Same as Parameter 3
T₃ Same as Parameter 1
T₄ $a_4$—Reset comparator 40 $\bar{a}_4$ on conductor 46
    Load SR. N with 94% RPM from gate G46 of diode matrix 12
    Reset low Prop RPM flip-flops 111–114 as appropriate via gates G95–G98 FIGURE 11
  $b_4$—Compare SR. A with SR. N looking for $A<N$.
    Shift SR. A around on itself via gate G5
    Shift SR. P around on itself via gate G10
  $d_4$—Set flip-flop 53 if answer to comparison is "YES" via gate G26
  $e_4$—On engine 4, provide pulse via gate G87 FIGURE 9 to clear output matrix 86
T₅ $a_5$—Reset comparator 40 $\bar{a}_5$ on conductor 46
    Load SR. N with 97% RPM from gate G47 of diode memory 12 if qualified by K4 signal from performance monitor 14
    Deliver 94% Prop RPM pulse to performance monitor 14 if flip-flop 53 is set via gate G31
    On engine 4, provide pulse to gate G83 FIGURE 9 to transfer worst case engine information
  $b_5$—Compare SR. A with SR. N looking for $A<N$
    Shift SR. A around on itself via gate G5
    Shift SR. P around on itself via gate G10
  $d_5$—Set flip-flop 53 if answer to comparison is "YES" via gate G26

$T_6$ $a_6$—Reset comparator 40 $\bar{a}_6$ on conductor 46
  Load SR. N with P5 lower malfunction limit from gates G48 or G50 as by performance monitor 14
  Set via G90 FIGURE 11 appropriate Prop Low RPM flip-flop, if flip-flop 53 is set
$b_6$—Compare SR. A with SR. N looking for $A$ $N$.
  Shift SR. A around on itself via gate G5
  Shift SR. P around on itself via gate G10
  Shift SR. Q around on itself via gate G14
$d_6$—Set flip-flop 53 if answer to comparison is "YES"
$e_6$—Set flip-flop 50 for $A>N$ $\bar{e}_6$ on conductor 51
$T_7$ $a_7$—Reset comparator 40 $\bar{a}_6$ on conductor 46
  Load SR. N with upper malfunction limit G49 or G51 as determined by performance monitor 14
$b_7$—Compare SR. A with SR. N looking for $A>N$.
  Shift SR. A around on itself via gate G5
  Shift SR. P around on itself via gate G10
  Shift SR. Q around on itself via gate G14
$d_7$—Set flip-flop 53 if answer to comparison is "YES"
$T_8$ Same as Parameter 1

Performance monitor 14 for this parameter, in addition to determining as a function of throttle position the variable upper and lower malfunction limits, also provides redline limit signals to display panel in the cockpit to indicate unsafe upper and lower limits, and a greenline signal to the display panel in the cockpit to indicate a range of values over which the engines should be operating.

The redline indicator is a two position flag on the %RPM display. It is usually at the 102% limit but may be driven to the 107% limit when suitably energized. The aircraft is such that it is unsafe to operate the engines at greater than 102% RPM for throttle positions of flight idle and above, CA$t$FI and above, and it is safe to operate the engines up to 107% RPM at throttle positions below flight idle CBFI. Performance monitor 14 receives a K2 signal on conductor 102, and when K2 is high, i.e. throttle in below flight idle position, a relay 129 is activated and drives the red flag to the 107% position. When the K2 signal goes low, the relay is opened and the flag returned to its usual position at 102%.

The greenline indication is also a two position flag located on the %RPM indicator in the cockpit. This flag is usually in the 98.5 to 101.5 range for the throttle positions of at flight idle and above. It is put in the range of 95 to 100%, when the throttle is in the below flight idle position. The K2 signal available on conductor 102 applied through relay 120 also drives the green flag to the 95 to 100% range when the K2 signal is high.

The %RPM parameter has the simplest type of variable malfunction limits, variable redline limits, and greenline range markers. These limits are always one of two values; the choice of the two values is a function of only four discrete values, namely one of the four throttle positions. The parameters of fuel flow P6 and turbine inlet temperature T8 are more complicated in that the malfunction limits are not one of two discrete values but are continuously variable, taking any value over a range and in addition to being a function of the four throttle positions, are also functions of air data variables that are continuously variable over a range of values. To complicate matters, these malfunction limits for these parameters are nonanalytic and nonlinear functions. Therefore, a look-up memory is used, and in optical memory 16, the tables of the variable functions are stored.

The fifth parameter is oil temperature and the operation of performance section 10 for this parameter is similar to the operations previously described, and may be traced with the aid of the following outline and notes appended thereto. It should be noted there is a fixed lower malfunction limit of 65° C., but a variable upper-malfunction limit of 85° or 100° C. The appropriate upper limit is selected by the performance monitor 14 as a function of throttle position, temperature, and elapsed time.

Parameter 5

OIL TEMPERATURE $T_1$ Same as Parameter 4
$T_2$ Same as Parameter 4
$T_3$ Same as Parameter 1
$T_4$ Same as Parameter 1
$T_5$ Same as Parameter 1
$T_6$ $a_6$—Reset comparator 40 $\bar{a}_6$ on conductor 46
  Load SR. N with Para. 6 lower malfunction limit from gate G52 of diode memory 12
$b_6$—Compare SR. A with SR. N looking for $A<N$.
  Shift SR. A around on itself via gate G5
  Shift SR. P around on itself via gate G10
  Shift SR. Q around on itself via gate G14
$d_6$—Set flip-flop 53 via gate G26 if answer to comparison is "YES"
$e_6$—Set flip-flop 50 for A N $\bar{e}_6$ on conductor 51
$T_7$ $a_7$—Reset comparator 40 $\bar{a}_7$ on conductor 46
  Load SR. N with Parameter 6 upper malfunction limit from gate G53 or G54 of diode memory 12 and as determined by performance monitor 14
$b_7$—Compare SR. A with SR. N looking for $A>N$.
  Shift SR. A around on itself via gate G5
  Shift SR. P around on itself via gate G10
  Shift SR. Q around on itself via gate G14
$d_7$—Set flip-flop 53 if answer to comparison is "YES" via gate G25
$e_7$—If $A>N$ is high signal on conductor 48, deliver (85° C. hi) pulse (negative) to performance monitor
$T_8$ Same as Parameter 1

The upper malfunction limits (see step $a_7$) are defined as follows: The limit is usually 85° C. however, when the throttle is in the CBFI position and the temperature is above 85° C., the limit changes to 100° C. for 30 minutes, and after 30 minutes returns to 85° C. and stays at 85° C. until the throttle is changed to a new position. Also, when the throttle is in either the CA$t$FI or CA$b$FI position and the temperature is above 85° C., the limit changes to 100° C. for 5 minutes, and after 5 minutes returns to 85° C., and stays at 85° C. until the throttle position is changed. Finally, when the throttle is CAFT, the limit is always 85° C.

If an engine's oil temperature exceeds 85°, there is provided after the $b_7$ pulse train a high signal from comparator 40 on conductor 48. The high signal is transferred via conductor 49 to a Nand gate G100, that, when also energized by timing signals P5 and $e_7$, transfers through inverter 107 a negative pulse to performance monitor 14.

In performance monitor 14, a flip-flop 130 is set at the beginning of the oil temperature parameter, by a P5 signal applied to its S input, and is reset during the oil temperature parameter computation by the negative 85° C. pulse from gate G100 and inverter 107 applied to its reset R terminal.

Flip-flop 130 provides a high on output R' when an engine's oil temperature is greater than 85°, and a high on output S' when all the engine's have oil temperatures less than 85° C. Output S' is connected by a conductor 131 to gate G53 of diode memory. When gate G53 is activated at a signal from S' and timing signal P5 and $a_7$, the 85° C. upper malfunction limit is applied to the N register.

The other output R' of flip-flop 130 is applied as one input to an AND gate 135. This AND gate and other AND gates used in this system are characterized as follows: When all inputs are high, the output is high, and when any input is low, the output is low. AND gate 135 has as a second input either the K2 or K3 signals which are applied through an OR gate 136. The OR gate 136, and other OR gates used in this system, are characterized by a high output when any of its inputs are high, and a low only when all its inputs are low.

AND gate 135 has all high inputs when flip-flop 130 is reset, i.e. oil temperature greater than 85°, and either K2 or K3 is high. An output from gate 135 passes through an OR gate 138 whose operation need not be considered now, through an inverter 140 that makes the high signal low. The low signal is applied through an OR gate 142 having a second input from a timing flip-flop 144. This flip-flop initially has low output on its reset terminal R' which is connected via conductor 145 as a second input to OR gate 142. Since both inputs to OR gate 142 are low, a low signal is provided at its output to an OR gate 146, having a second input of the K5 signal. Both these signals are low when temperature exceeds 85° C., and the throttle is in other than the CAFT. A low output is provided from gate 146 through an inverter 148 that makes the low signal high. This high signal is available on a conductor 150 to energize gate G54 into diode memory 12. Gate 54 also receives the P5 and the $a_7$ timing pulse and provides the 100° C. upper-malfunction limit to the N register.

The signal on conductor 150 is also applied through an inverter 152 to conductor 131, which it will be recalled is connected to the 85° limit gate G53 in diode memory 12. This gate G53 is disqualified when the 100° upper limit is required.

The upper malfunction limits are also displayed on the oil temperature indicator as a minimum unsafe or upper redline limit. Conductor 150 applies a signal to a relay 154 that activates a redline indicator on the oil temperature indicator in the cockpit. This indicator is normally in the 85° position and is driven to the 100° position when the relay is energized.

The 100° limit is maintained for 5 or 30 minutes, or until a throttle position is changed, and is partially controlled by a signal on conductor 145 from timing flip-flop 144. This flip-flop is in turn controlled by a timing or timer mechanism 155 that is activated by a negative or low signal from the output of OR gate 142. Timer 155 provides after 5 minutes, 30 minutes, and 35 minutes, a negative-going pulse and is further characterized that once its input signal is no longer low, the timing cycle is stopped and reset to zero, where it remains until a low signal is again applied to its input. The 5 minute pulse and the 30 minutes pulse are shown provided on conductor 156 and 157. These two signals are applied respectively with the K3 and the K2 signals to AND gates 158 and 159. Outputs from gates 158 and 159 pass through an OR gate 160 and are applied through an inverter 161 to reset input of timing flip-flop 144. Thus, if the throttle position is at CBFI, K2 is high, and after 30 minutes, a positive pulse from timer is applied to AND gate 158 that apply a positive signal through OR gate 160 and a negative signal from inverter 161 to reset timer 144, providing a high signal on R' through conductor 145 to OR gate 142 providing a high output, and in turn, a high output from gate 146, and low output from inverter 148 that does not qualify or activate gate G54 in diode matrix 12 or the redline indicator through relay 154. The high signal thus produced in the output of gate 142 inactivates the timer and sets it back to zero. The timing flip-flop 144 is now reset holding the output of gate 142 high, and further measurements of engine temperature greater than 85° C. do not shift the limit to 100° until flip-flop 144 is reset.

Flip-flop 144 is reset by a change of throttle position. When the throttle is moved from the below flight idle CBFI to a flight position CA$t$FI, K3 goes high setting flip-flop 144 via conductor 163 and inverter 164 and renders output R' low. When the throttle is moved from the at flight idle, CA$t$FI to above flight idle CA$b$FI position, K4 goes high, applying a signal via conductor 165 to set input S of flip-flop 144 rendering R' output low. Flip-flop 144 is initially set when the engine is turned on by a high signal from the ignition switch via conductor 166.

When the throttle position is CAFT, the upper malfunction limit is maintained at 85° C. and never advances to the 100° limit. In this throttle position, K5 is high and this signal is applied to OR gate 146 to maintain a high output from gate 146 which is low signal on conductor 150 disabling the 100° limit.

The sixth parameter is fuel flow, and the amount of fuel flowing to the engine receiving the most fuel is displayed on display 22. Also, a warning signal is provided by computing section 6 whenever fuel flow to any engine is less than 75 percent of the fuel flow to the engine receiving the most fuel.

Performance section 10 during timing intervals T1, T2, and T3 determines which engine receives the most fuel.

The warning signals are determined as follows. After the $b_3$ pulse train in the fourth engine E4 cycle, the P register contains a number proportional to the actual fuel flow to the engine which receives the most fuel. This number is transferred by the $b_4$ pulse train during the fourth engine's cycle through a gate G14, which is qualified by the coincidence of signal P6, E4, and T4 to a 75 percent multiplier 29 that takes 75 percent of the number applied and directly transfers a number equal to 75 percent of this number to a register R. The 75 percent number is the lower malfunction limit of the fuel flow parameter and is immediately available for the fourth engine malfunction determination when fuel flow is again considered and is available for engines 1, 2, and 3 malfunction determination in the next sequence cycle.

During the fifth timing interval for each of the four engines, a $b_5$ signal is applied through a gate G27, shifts the 75 percent limit into the N register via gate G6, and, at the same time, moves the 75 percent limit around on itself through a gate G15. Both gates G6 and G15 are partially qualified by the T5 signal.

The 75 percent limit is compared with each engine quantity in the sixth timing period in response to $b_6$ pulse train that shifts into comparator 40 a number from the N register proportional to the 75 percent limit, and a number from the A register proportional to an engine's fuel flow. If the fuel flow in any engine is less than 75 percent limit, a malfunction Nixie bulb is illuminated and displayed within the cockpit.

The operation of performance section 10 for this parameter, except as described above and outlined below, is the same as, and may be traced in detail with the aid of, the third parameter outline in intervals T1 and T2, and the first parameter outline for the remaining timing intervals.

OUTLINE $b_4$—on engine 4 transfer number in P register to 75% multiplier 29 via gate G14,
$b_5$—transfer R register via gate G6,
Shift R around on itself via gate G15.

The last parameter is turbine inlet temperature. During the seventh parameter timing cycle P7, computing section 6 determines the optimum turbine inlet temperature. This optimum temperature is a function of fuel flow $W_F$, impact pressure $P_s$, and pressure altitude $H_p$.

The relationship between optimum TIT, as a function of $P_s$, $H_p$, and $W_F$ is dictated by the aircraft design and power plant and is displayed graphically in charts provided by the aircraft manufacturer. Heretofore, the flight crew from time to time would read the $H_p$, $P_s$, and $W_F$ indicator dials in the cockpit, then consult the graphs provided by the manufacturer, and graphically plot optimum TIT. The indicator system continuously computes the optimum value and displays this value on the same indicator that shows actual TIT of the worst performing engine.

The optimum TIT is determined in performance look-up memory 16 of computing section 6 which is shown in the schematic diagram of FIGURE 12. Look-up memory 16 uses a memory storage drum whereon the non-linear relationship between the $P_s$, $W_F$ and $H_p$ stored in incremental fashion. The drum is part of two encoders 201 and 210 of a type that receive two variables and provide a digital output signal in accordance with a function of the two variables. The encoders 201 and 210 may be of the kind shown and described in Robinson U.S. applications Ser. Nos. 806,625 and 76,244, both entitled Encoders and assigned to the same assignee as the present application.

In the first ten milliseconds of the P7 cycle designated E1, a signal proportional to the static pressure $H_p$ is switched via switch 2 to analog to digital converter 4 which during the second reference cycle fills the A register via gate G3 with a digital number proportional to the $H_p$ quantity.

The P register at this time contains a number proportional to the maximum fuel flow $W_F$, which is left over from the previous fuel flow parameter computations.

At the beginning of the third reference cycle in the E1, P7 timing period, the $b_1$ pulse train transfers the contents of the A and P registers, having respectively, numbers proportional to $Q_c$ and $W_F$, to first encoder 201 via gates G16 and G17, which are qualified by the coincidence of P7, E1 and T1 timing signals. Encoder 201 during the balance of the E1, P7 time period determines as a function of $W_F$ and $Q_c$ an intermediate value $f(W_F, Q_c)$ which is provided to a register 211.

During the second reference cycle of the P7, E2 timing period, input switch 2 and analog to digital converter 4 provides to the A register via gate G3 a digital number proportional to $H_p$. This number is transferred to encoder 210 at the beginning of the third reference signal by $b_1$ pulse and a gate G18 partially qualified by T1 of P7, E2 timing signals. Encoder 210 also receives the intermediate value $f(Q_c, W_F)$ from register 211 upon the coincidence of P7, E2 and $\bar{b}_1$ signals applied to a gate G19.

Second encoder 210 during the third and fourth reference cycles of E2 determine optimum TIT and transfers a signal proportional to this value in digital form to an output register 212.

The contents of register 212 are transferred out by a $\bar{b}_1$ pulse train, coincident with P7 and E3 timing signals at gate 214 during the third reference cycle of the P7, E3 time period. In turn, the contents are transferred around to register 212 via gate 216, which is qualified by P7, E3, T1 timing signals, and are also transferred to a digital to analog transducer 220 via gate 218, which is partially qualified by P7, E3, T1 timing signals. Digital to analog transducer 220 converts the digital number proportional to optimum turbine inlet temperature into a mechanical displacement of a greenline indicator on the TIT instrument panel.

In the eighth parameter timing cycle P8, performance section 10 during intervals T1, T2, T3 determines which engine turbine inlet temperature is the warmest and activates switch 20 to transfer that engine temperature to a cockpit TIT indicator. The operation of performance section 10 during these intervals for TIT is identical its operation during the third parameter cycle described above.

During the sixth and seventh timing intervals, performance section 10 compares an engine's turbine inlet temperature to variable upper and lower malfunction limits. These limits are determined by performance look-up memory 16 and are defined as follows. When throttle position is at flight idle or above, CA$t$FI, CA$b$FI, or CAFT, the upper limit is 6° C. greater than optimum and the lower limit is 14° less than optimum. When throttle position is below flight idle, CBFI, the upper and lower limits are optimum plus and minus 20° C. respectively.

The lower malfunction limit is compared to an engine's temperature during the sixth T6 timing interval and the upper malfunction limit is compared during the seventh T7 timing interval.

The lower malfunction limit is determined during the T1 interval of the P8 cycle. On the first engine cycle E1, gates 222 and 223 are partially qualified by timing signals P8, E1, $a_1$ applied at their inputs, and one of the gates is fully qualified by an additional K2 or K3 throttle position signal corresponding to CBFI position or CA$b$FI and above position. Gate 222, when energized, enables the converse of a number proportional to 14 stored in a diode memory 224, into register 212 for subtraction; and gate 223 when energized enables a number proportional to the converse of 20 into register 212 for subtraction. The subtracted number is equal to the lower malfunction limit and is transferred into the N register through conductor 225 when register 212 is activated by a shift pulse train made up by the coincidence of $\bar{b}_6$ and P8 signals through a gate 226. The lower limit is also transferred around on itself through gate 228 which partially qualified by P8 and T6 timing signals.

To obtain the upper malfunction limit either of gates 232 or 233 is activated by the coincidence of both P8, $a_7$ timing signals and respectively by K2 and K3 command signals. Gates 232 or 233, when energized, enable respectively a number proportional to 20 or 40 from diode matrix 224 into register 212 for addition. The new number in register 212 is the upper malfunction limit and is transferred by coincidence P8 and $\bar{b}_7$ signals applied to gate 226 to shift the contents of register 212 to N register via conductor 225. Register 212 is also shifted around on itself via gate 228 that is partially qualified by signals P8 and T7.

To obtain the lower malfunction limits for the second and subsequent engine cycles either of two gates 236 or 238 is activated by the coincidence of signals P8, $a_1$, and E2, E3, or E4 signals as appropriate, and respectively K2 or K3 command signals. Gates 236 or 238 when energized enable respectively a number proportional to inverse of 20 and the inverse of 40 into register 212 for subtraction.

The operation of performance section 10 for this parameter except as just described is the same as and may be traced in detail with the aid of the third parameter outline in intervals T1 and T2, and the first parameter outline in the remaining timing intervals.

The upper and lower malfunction limits are also displayed on the TIT cockpit indicator as greenline or acceptable range limits. The lower limit is shifted from A register 212 by the $\bar{b}_6$, P8 timing signals from gate 226 and through a gate 240 partially qualified by P8, E1 and T6 timing signals to a digital to analog transducer 242 of a type that converts this number into a mechanical displacement of the lower greenline range indicator in the cockpit. Likewise, the upper limit is shifted by the $\bar{b}_7$, P8 timing signals coming from gate 226 to register 212 and through a gate 244 partially qualified by P8, E1, T7 signals to a digital to analog converter 246 of a type that converts this number to a mechanical displacement of the upper greenline range indicator in the cockpit.

The redline or unsafe range indicators for this parameter are a function of throttle position, elapse time and %RPM. They are defined as follows when %RPM is less than 94%, the redline limit is 881°. When the %RPM is greater than 94% and the throttle position is in CAFT for more than 35 minutes, the redline is 932° and for all other times, the redline is at 972°. The indicator itself in the cockpit is a three position flag, when unenergized is at the 972° position and is driven to the other two positions by relays.

Referring to performance monitor 14 in FIG. 10, a flip-flop 250 is reset at the beginning of the P4 cycle by $\overline{P5}$ signal applied at reset terminal R and is set if an engine's %RPM is less than 94% by a pulse at set terminal S. When set flip-flop 250 provides a high signal on output terminal S' on a conductor 251 to energize relay 254 that drives the redline TIT indicator to 881°. When the throttle position is in CAFT, K5 signal is high, and if %RPM is greater than 94° output R' is also high. These signals are applied on conductors 260 and 262, respectively, to Nand gates 264 that passes a signal when both inputs are high to energize timing clutch. The K5 signal and also reset output from flip-flop 250 are applied to Nand gate 268 that also receives a 35 minute pulse. An output from gate 268 sets flip-flop 270, and a set output S' activates relay 272 that drives the TIT redline to 932° whence it stops until flip-flop 270 is reset by a $\overline{K2}$ pulse.

The techniques of solid state analog to digital, digital to analog conversions, sequential sampling, comparison against fixed and variable limits, and high density data storage and computing used in the computer lend themselves to applications other than engine monitoring. One such application is for thrust measurement and computing for turbojet and turbofan engines. A design study has shown that for one high reliability application requiring redundancy the digital technique offers a size and weight advantage over conventional analog techniques. Using digital techniques it is possible to present the pilot and flight engineer with thrust information at a high repetition rate. The computer can compute actual thrust being generated and also, by accepting inputs from an air data computer, determine the available thrust for existing conditions of air temperature, altitude and speed thus allowing easy determination of reserve power available.

Another area which has been invetsigated is that of automatic monitoring of a bacteriological detection system. In this application inputs to the system would be from remote automated stations which would provide data on the bacteria count in the air. These inputs would be sequentially sampled, converted to digital form and processed to display worst conditions in various areas. When bacteria levels or rates of change in level exceeded safe values an alarm would be sounded. The computer would be programmed to account for normal variations in the air at the remote locations.

A third application is one of automatically monitoring of inflight performance of rockets such as vehicles for moon landing. Trajectory information can be processed and any malfunctions resulting in course errors would be detected and transmitted.

Many other applications can be accommodated using these digital techniques: process control, automatic checkout of target drone count downs, angle of attack determination of re-entry vehicles are just a few under consideration.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A system for comparing a performance parameter of several devices and displaying the performance parameter of the worst performing device, comprising means for providing a digital signal for each device corresponding to the parameter, performance means connected to the signal means and including means for sequentially comparing the digital signals and selecting the signal of the worst performing device, and indicator means connected to the performance means and to the signal means for displaying the performance parameter of the worst performing device.

2. An indicator system for displaying a performance parameter of a worst performing device of one of several devices, comprising means for providing a signal for each device corresponding to the parameter, performance means connected to the signal means for comparing the signals and selecting the signal of the worst performing device, said performance means comparing each signal to a reference and providing a malfunction signal when the parameter signal departs from the reference a predetermined amount, and indicator means connected to the performance means and to the signal means for displaying the performance parameter of the worst performing device and for indicating the device which is malfunctioning.

3. An indicator system for displaying a performance parameter of several devices, comprising means for providing a signal for each device corresponding to the parameter, performance means connected to the signal means for comparing the signals and selecting the signal of the worst performing device and providing a malfunction signal when two parameter signals differ from one another by a predetermined amount, and indicator means connected to the performance means and to the signal means for displaying the performance parameter of the worst performing device, and for indicating the device which is malfunctioning.

4. An indicator system for displaying a plurality of performance parameters of several devices, comprising
 (a) means for providing signals corresponding to the parameters,
 (b) switching means
  connected to the signal means for sequentially providing signals of like parameters in groups for the several devices,
 (c) performance means
  connected to the switching means for comparing the signals of a group and selecting the signal of the worst performing device, and
 (d) a plurality of indicators
  connected to the performance means and to the signal means for displaying the performance parameters of the worst performing devices.

5. An indicator system for displaying a plurality of performance parameters of several devices comprising
 (a) means for providing signals corresponding to the parameters,
 (b) switching means
  connected to the signal means for sequentially providing signals of like parameters in groups for the several devices,
 (c) performance means
  connected to the switching means for comparing the signals of a group and selecting the signal of the worst performing device, said performance means comparing each signal to a reference and providing a malfunction signal when the parameter signal departs from the reference a predetermined amount, and
 (d) a plurality of indicators connected to the performance means and to the signal means for displaying the performance parameters of the worst performing devices, and for displaying the device which is malfunctioning.

6. An indicator system for providing information as to a plurality of performance parameters of several devices, comprising
 (a) means for providing signals corresponding to each parameter of each device,
 (b) switching means
  connected to the signal means for sequentially providing signals of like parameters in groups for the several devices, (c) performance means connected to the switching means for comparing the signals of each group and selecting the signal of the worst performing device and providing a warning signal when two parameter signals of one group differ from one another by a predetermined amount, said performance means comparing the signals of a group to a reference and providing a malfunction signal when a parameter signal departs from the reference a predetermined amount, and (d) indicator means connected to the performance means and to the signal means for displaying the performance parameters of the worst performing device in each group and for indicating a warning that two parameters of a group differ from one another by a predetermined amount and for indicating each device of a group which is malfunctioning.

7. A system for comparing a plurality of performance parameters of several devices and displaying the performance parameters of the worst performing devices, comprising means for providing analog signals for each device corresponding to each parameter, input switching means connected to said analog signal means for receiving the signals and sequentially providing signals for each parameter in groups for the several devices, an analog-to-digital converter connected to the switching means and converting the analog signals to digital signals, performance means connected to the analog-to-digital converter for comparing the digital signals of a group and selecting the signal of the worst performing device, indicating means, and output switching means controlled by the performance means and connecting the analog signal means to the indicating means for displaying the parameters of the worst performing devices.

8. A system for comparing a plurality of performance parameters of several devices and displaying the performance parameters of the worst performing devices, comprising means for providing analog signals for each device corresponding to each parameter, input switching means connected to said analog signal means for receiving the signals and sequentially providing signals for each parameter in groups for the several devices, an analog-to-digital converter connected to the switching means and converting the analog signals to digital signals, performance means connected to the analog-to-digital converter for comparing the digital signals of a group and selecting the signal of the worst performing device, means for providing signals corresponding to the upper and lower normal operating limits of at least one parameter, indicating means, and output switching means controlled by the performance means and connecting the analog signal means to the indicating means for displaying the parameters of the worst performing device and for connecting the limit means to the indicating means for indicating the upper and lower normal operating limits of the parameter.

9. A system as in claim 8 in which the performance means compares each signal of the one parameter to a limit signal and provides a malfunction indication when the parameter is outside the normal operating limits.

10. A system for comparing a plurality of performance parameters of several devices and displaying the performance parameters of the worst performing devices, comprising means for providing analog signals for each device corresponding to each parameter, input switching means connected to said analog signal means for receiving the signals, digital timing means for controlling the switching means to sequentially provide signals for each parameter in groups for the several devices, and analog-to-digital converter connected to the switching means and converting the analog signals to digital signals, performance means connected to the analog-to-digital converter and controlled by the digital timing means for comparing the digital signals of a group and selecting the signal of the worst performing device, indicating means, and output switching means controlled by the performance means and connecting the analog signal means to the indicating means for displaying the parameters of the worst performing devices.

11. A system for comparing a plurality of performance parameters of several devices and displaying the performance parameters of the worst performing devices, comprising means for providing analog signals for each device corresponding to each parameter, input switching means receiving the signals, digital timing means for controlling the switching means to sequentially provide signals for each parameter in groups for the several devices and to provide a period between each group analog signal for settling transients, an analog-to-digital converter connected to the switching means and converting the analog signals to digital signals, performance means connected to the analog-to-digital converter and controlled by the digital timing means for comparing the digital signals of a group and selecting the signal of the worst performing device, indicating means, and output switching means controlled by the performance means and connecting the analog signal means to the indicating means for displaying the parameters of the worst performing devices.

12. A system for comparing a performance parameter of several devices and displaying the parameter of the worst performing device, comprising means for providing a signal for each device corresponding to the parameter, performance means connected to the signal means and including means for sequentially comparing the signals and selecting the signal of the worst performing device, means for providing signals corresponding to the upper and lower normal operating limits of the parameter, and indicating means connected to the performance means and to the signal means for displaying the performance parameter of the worst performing device and connected to said limit means to indicate the upper and lower normal operating limits of the device.

13. A system as in claim 12 which includes means to compare each signal to a limit signal to provide a malfunction indication on the indicating means when the parameter of a device is outside the normal operating limits.

14. A system as in claim 12 having means for providing a signal corresponding to the optimum value of the parameter, and said indicating means being connected to said optimum value means to indicate the optimum value of the parameter.

15. A system as in claim 12 having means for providing a signal corresponding to the optimum value of the parameter which changes with a change in a condition, said means being responsive to the condition, and said indicating means being connected to said optimum value means to indicate the optimum value of the parameter in accordance with the condition.

16. A system as in claim 12 which includes means to compare each signal to a limit signal to provide a malfunction signal when the parameter of a device is outside the normal operating limits, means for providing a signal corresponding to the optimum value of the parameter, and said indicating means being connected to said comparing means to indicate a malfunction of a device and to said optimum value means to indicate the optimum value of the parameter.

17. A system for comparing a performance parameter of several devices and displaying the parameter of the worst performing device, comprising means for providing a signal for each device corresponding to the parameter, performance means connected to the signal means and including means for sequentially comparing the signals and selecting the signal of the worst performing device, means for providing a signal corresponding to a predetermined percentage of the signal of the worst performing device, indicating means connected to the performance means and to the signal means for displaying the performance parameter of the worst performing device, said performance means comparing each parameter signal to the percentage signal and providing a malfunction indication when the parameter signal is beyond the percentage signal.

18. A system for comparing a performance parameter of several devices, comprising means for providing a signal for each device corresponding to the parameter, performance means connected to the signal means and including means for sequentially comparing the signals and selecting the highest signal, means for providing signals corresponding to a predetermined percentage of but smaller than the highest parameter signal, indicating means connected to the performance means and to the parameter signal means for displaying the performance parameter of the device providing the highest parameter signal, said performance means comparing each signal to the percentage signal and providing a malfunction indication on said indicating means when the parameter signal is lower than the percentage signal.

19. A system for comparing a plurality of performance parameters of several devices and displaying the performance parameters of the worst performing devices, comprising means for providing analog signals for each device corresponding to each parameter, input switching means connected to said analog signal means for receiving the signals, digital timing means for controlling the switching means to sequentially provide signals for each parameter in groups for the several devices, an analog-to-digital converter connected to the switching means and converting the analog signals to digital signals, a computing section connected to the analog-to-digital converter and including performance means controlled by the digital timing means for comparing the digital signals of a group and selecting the signal of the worst performing device in each group, diode memory means for providing signals corresponding to the upper and lower normal operating limits of at least one parameter, a performance monitor and look-up memory means for providing a signal corresponding to the optimum value of at least one parameter, indicating means, and output switching means controlled by the performance means and connecting the analog signal means to the indicating means for displaying the parameters of the worst performing devices, and said computing system including gating means controlled by the timing means and connecting the computing section to the indicating means to indicate upper and lower normal operating limits and the optimum value of at least one parameter and malfunctions of the devices.

References Cited by the Examiner

UNITED STATES PATENTS

| | | | |
|---|---|---|---|
| 2,444,421 | 7/1948 | Boston | 340—213 |
| 2,560,829 | 7/1951 | Stewart | 340—163 X |
| 2,815,500 | 12/1957 | Hance et al. | 340—149 X |
| 2,974,286 | 3/1961 | Meyer | 340—172 X |
| 3,031,142 | 4/1962 | Cohen et al. | |
| 3,123,774 | 3/1964 | Davis | 340—213 X |
| 3,159,825 | 12/1964 | Bianchi et al. | 340—248 |

NEIL C. READ, *Primary Examiner.*